United States Patent
Mitsuhashi et al.

(10) Patent No.: US 10,489,646 B2
(45) Date of Patent: Nov. 26, 2019

(54) DIAGNOSTIC DEVICE, DIAGNOSTIC SYSTEM, DEVICE, DIAGNOSTIC METHOD, AND NON-TRANSITORY COMPUTER-READABLE MEDIUM

(71) Applicant: FUJI XEROX CO., LTD., Tokyo (JP)

(72) Inventors: Tomoyuki Mitsuhashi, Kanagawa (JP); Katsuyuki Kouno, Kanagawa (JP); Atsushi Ito, Kanagawa (JP); Fumihiko Ogasawara, Kanagawa (JP); Tsutomu Udaka, Kanagawa (JP); Shinya Miyamori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 316 days.

(21) Appl. No.: 15/098,879

(22) Filed: Apr. 14, 2016

(65) Prior Publication Data
US 2017/0169280 A1   Jun. 15, 2017

(30) Foreign Application Priority Data

Dec. 14, 2015   (JP) .................................. 2015-243113

(51) Int. Cl.
  *G06K 9/00*   (2006.01)
  *G01M 99/00*   (2011.01)
  (Continued)

(52) U.S. Cl.
  CPC ......... *G06K 9/0053* (2013.01); *G01M 99/005* (2013.01); *G10L 25/21* (2013.01); *G10L 25/48* (2013.01); *H04N 1/00015* (2013.01); *H04N 1/00029* (2013.01); *H04N 1/00037* (2013.01); *H04N 1/00058* (2013.01); *G10L 25/18* (2013.01)

(58) Field of Classification Search
None
See application file for complete search history.

(56) References Cited

U.S. PATENT DOCUMENTS

2007/0070456 A1   3/2007   Nishimura
2009/0002490 A1*  1/2009   Saito .................. G08B 13/1672
                                                     348/143

FOREIGN PATENT DOCUMENTS

CN   102809493 A   12/2012
CN   103053136 A    4/2013
(Continued)

OTHER PUBLICATIONS

Mar. 7, 2016 Office Action issued in Japanese Patent Application No. 2015-243113.

(Continued)

*Primary Examiner* — Alexander G Ghyka
(74) *Attorney, Agent, or Firm* — Oliff PLC

(57) ABSTRACT

A diagnostic device includes an acquisition unit, an extraction unit, a generation unit, and a display. The acquisition unit acquires sound information. The extraction unit extracts, from the acquired sound information, device information related to a device to be analyzed. The generation unit performs time-frequency analysis on the acquired sound information, and generates a first analysis result expressing change over time in an intensity distribution at each frequency. The display displays a second analysis result chosen on the basis of the first analysis result and the device information, and the first analysis result.

18 Claims, 22 Drawing Sheets

(51) Int. Cl.
*H04N 1/00* (2006.01)
*G10L 25/21* (2013.01)
*G10L 25/48* (2013.01)
*G10L 25/18* (2013.01)

(56) References Cited

FOREIGN PATENT DOCUMENTS

| | | |
|---|---|---|
| JP | H10-258974 A | 9/1998 |
| JP | 2007-079263 A | 3/2007 |
| JP | 2008-290288 A | 12/2008 |
| JP | 2009-246656 A | 10/2009 |
| JP | 2013-517449 A | 5/2013 |
| WO | 2011/087329 A2 | 7/2011 |

OTHER PUBLICATIONS

Nov. 1, 2018 Office Action issued in Chinese Application No. 201610402913.5.
Jul. 1, 2019 Office Action issued in Chinese Patent Application No. 201610402913.5.

* cited by examiner

FIG. 6

| MODEL NAME: ABC001 | | | |
|---|---|---|---|
| WAVEFORM DATA OF FREQUENCY ANALYSIS RESULT | SOUND DATA OF NOISE | CAUSE OF NOISE | TREATMENT |
| WAVEFORM DATA 1 | SOUND DATA 1 | WEAR ON PHOTORECEPTOR DRUM | REPLACE PHOTORECEPTOR DRUM |
| WAVEFORM DATA 2 | SOUND DATA 2 | INSUFFICIENT GREASE IN SHEET TRANSPORT DEVICE | APPLY GREASE |
| ..... | ..... | ..... | ..... |
| WAVEFORM DATA 30 | SOUND DATA 30 | TROUBLE WITH DRIVING MOTOR | REPLACE DRIVING MOTOR |

MODEL NAME: ABC002

MODEL NAME: ABC003

DIAGNOSTIC DEVICE, DIAGNOSTIC SYSTEM, DEVICE, DIAGNOSTIC METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-243113 filed Dec. 14, 2015.

BACKGROUND

Technical Field

The present invention relates to a diagnostic device, a diagnostic system, a device, a diagnostic method, and a non-transitory computer-readable medium.

SUMMARY

According to an aspect of the invention, there is provided a diagnostic device including an acquisition unit, an extraction unit, a generation unit, and a display. The acquisition unit acquires sound information. The extraction unit extracts, from the acquired sound information, device information related to a device to be analyzed. The generation unit performs time-frequency analysis on the acquired sound information, and generates a first analysis result expressing change over time in an intensity distribution at each frequency. The display displays a second analysis result chosen on the basis of the first analysis result and the device information, and the first analysis result.

BRIEF DESCRIPTION OF THE DRAWINGS

An exemplary embodiment of the present invention will be described in detail based on the following figures, wherein:

FIG. 6 is a diagram illustrating an example of information stored in the waveform data storage 53 illustrated in FIG. 5;

DETAILED DESCRIPTION

Next, an exemplary embodiment of the present invention will be described in detail and with reference to the drawings.

Figure 1:
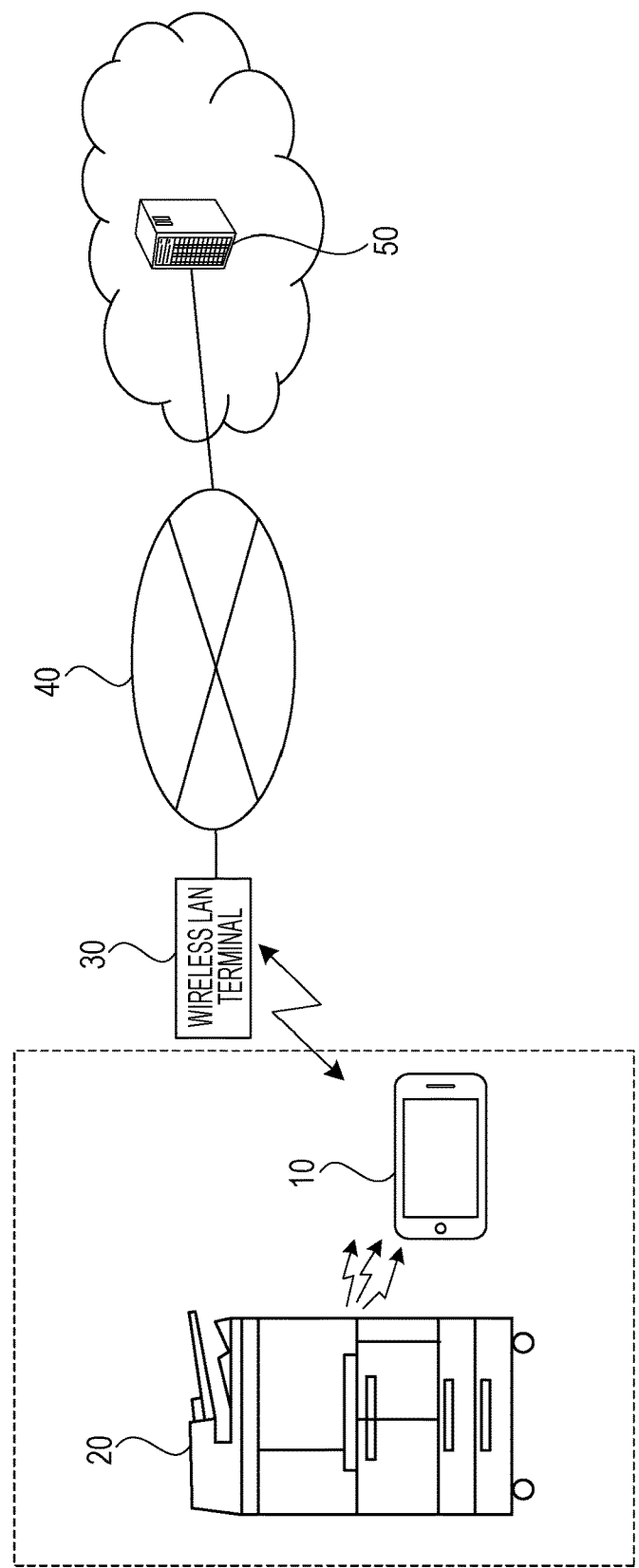
FIG. 1 is a system diagram illustrating a configuration of a noise diagnostic system according to an exemplary embodiment of the present invention.

FIG. 1 is a system diagram illustrating a configuration of a noise diagnostic system according to an embodiment of the present invention.

As illustrated in FIG. 1, the noise diagnostic system according to an exemplary embodiment of the present invention is made up of a mobile noise diagnostic device 10, such as a personal computer, a smartphone, or a tablet, and a server device 50.

Note that the present invention is still applicable insofar as the noise diagnostic device 10 is a device able to connect to the server device 50 over a communication network. However, the present exemplary embodiment will be described using a case in which the noise diagnostic device 10 is a tablet equipped with a device such as a microphone able to acquire a sound signal, and also allowing touch input.

The noise diagnostic device 10 is carried by a serviceman (maintenance personnel) who maintains, manages, and repairs an image forming device 20, such as a printer used by end users. The noise diagnostic device 10 is used to acquire a noise (abnormal sound) signal produced in the image forming device 20, perform frequency analysis of the acquired noise signal, and display a frequency analysis result waveform of previous noise signals acquired from the server device 50 and a frequency analysis result waveform of the acquired noise signal.

The noise diagnostic device 10 and the server device 50 are connected to each other and exchange information via a wireless LAN terminal 30, such as a Wi-Fi router, and an Internet communication network 40.

Note that when the noise diagnostic device 10 is a device such as a mobile phone or a smartphone, the noise diagnostic device 10 and the server device 50 may also connect to each other and exchange frequency analysis result waveform data via a mobile phone network.

In the noise diagnostic system according to the present exemplary embodiment, when a noise is produced in a certain image forming device 20 that acts as a target electronic device installed in an end user location, a serviceman carrying the noise diagnostic device 10 is dispatched to the location of the image forming device 20. Subsequently, the serviceman acquires a noise signal by using the noise diagnostic device 10 to record the noise being produced, and performs a noise diagnosis that identifies the cause of the noise.

Note that it is also technically possible to equip the image forming device 20 with a sound-recording function by providing a microphone or the like and cause the image forming device 20 to record noise using this sound-recording function when noise is produced, but when the image forming device 20 is installed in a location such as an end user office, providing the image forming device 20 with a function of recording sound may be undesirable for security reasons.

Figure 2:
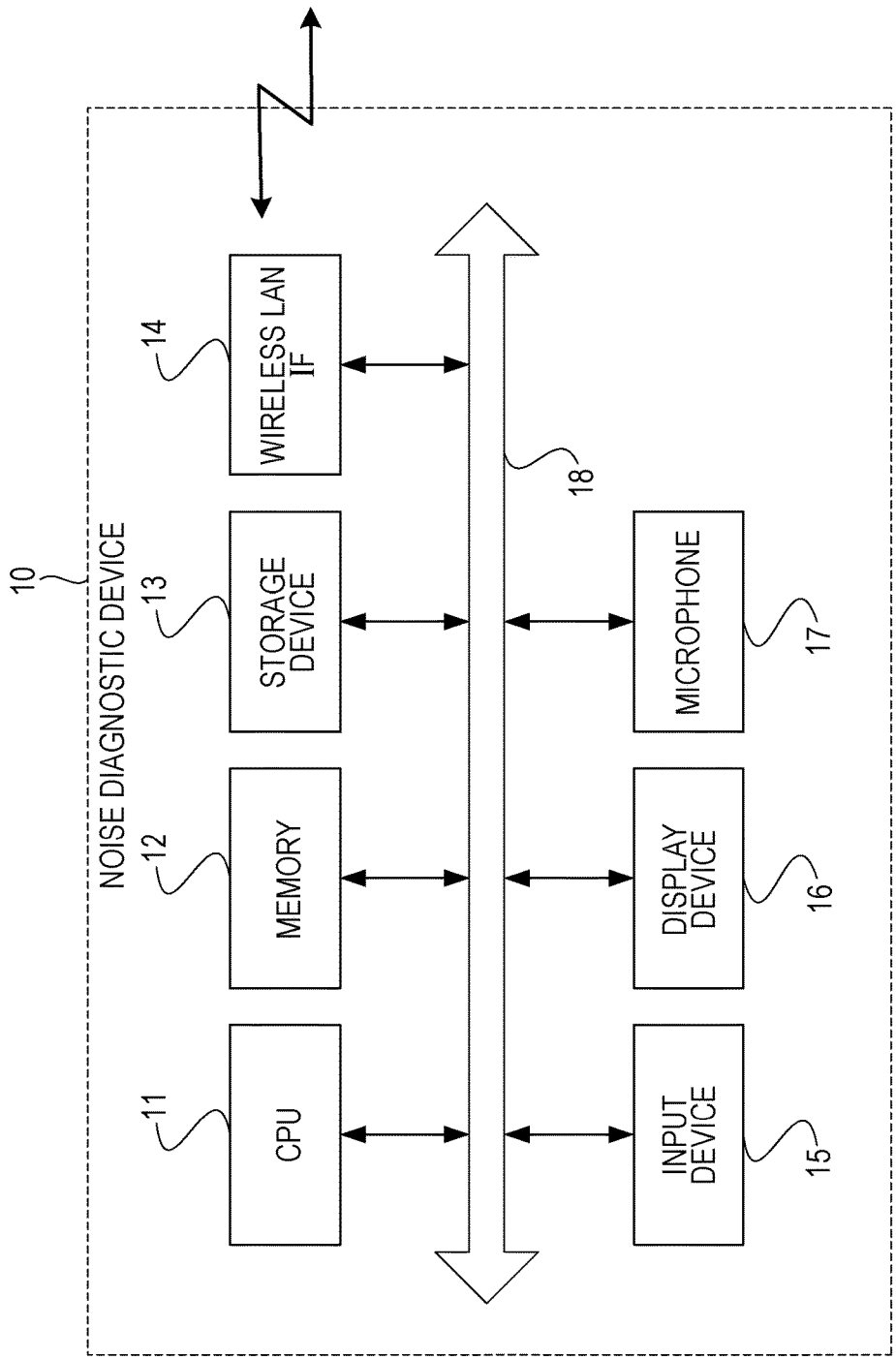
FIG. 2 is a block diagram illustrating a hardware configuration of a noise diagnostic device 10 according to an exemplary embodiment of the present invention.

Next, FIG. 2 illustrates a hardware configuration of the noise diagnostic device 10 in a noise diagnostic system according to the present exemplary embodiment.

As illustrated in FIG. 2, the noise diagnostic device 10 includes a CPU 11, memory 12 capable of saving data temporarily, a storage device 13 such as flash memory, a wireless LAN interface (IF) 14 that performs wireless communication to transmit and receive data to and from the wireless LAN terminal 30, an input device 15 such as a touch sensor, a display device 16, and a microphone 17. These structural elements are connected to each other by a control bus 18.

The noise diagnostic device 10 according to the present exemplary embodiment is equipped with a touch panel in which a touch sensor for detecting a touch position on the display device 16 is provided as the input device 15, and this touch panel is used to present a display while also accepting input from a user.

The CPU 11 controls the operation of the noise diagnostic device 10 by executing designated processes on the basis of a control program stored in the memory 12 or the storage device 13. Note that the control program may also be acquired and provided to the CPU 11 by being downloaded via the Internet communication network 40 or a mobile phone network, or be provided to the CPU 11 by storing such a program on a storage medium such as CD-ROM.

As a result of the above control program being executed, the noise diagnostic device 10 according to the present exemplary embodiment performs operations like those described hereinafter, and assists the serviceman in the work of identifying the cause of noise.

Figure 3:
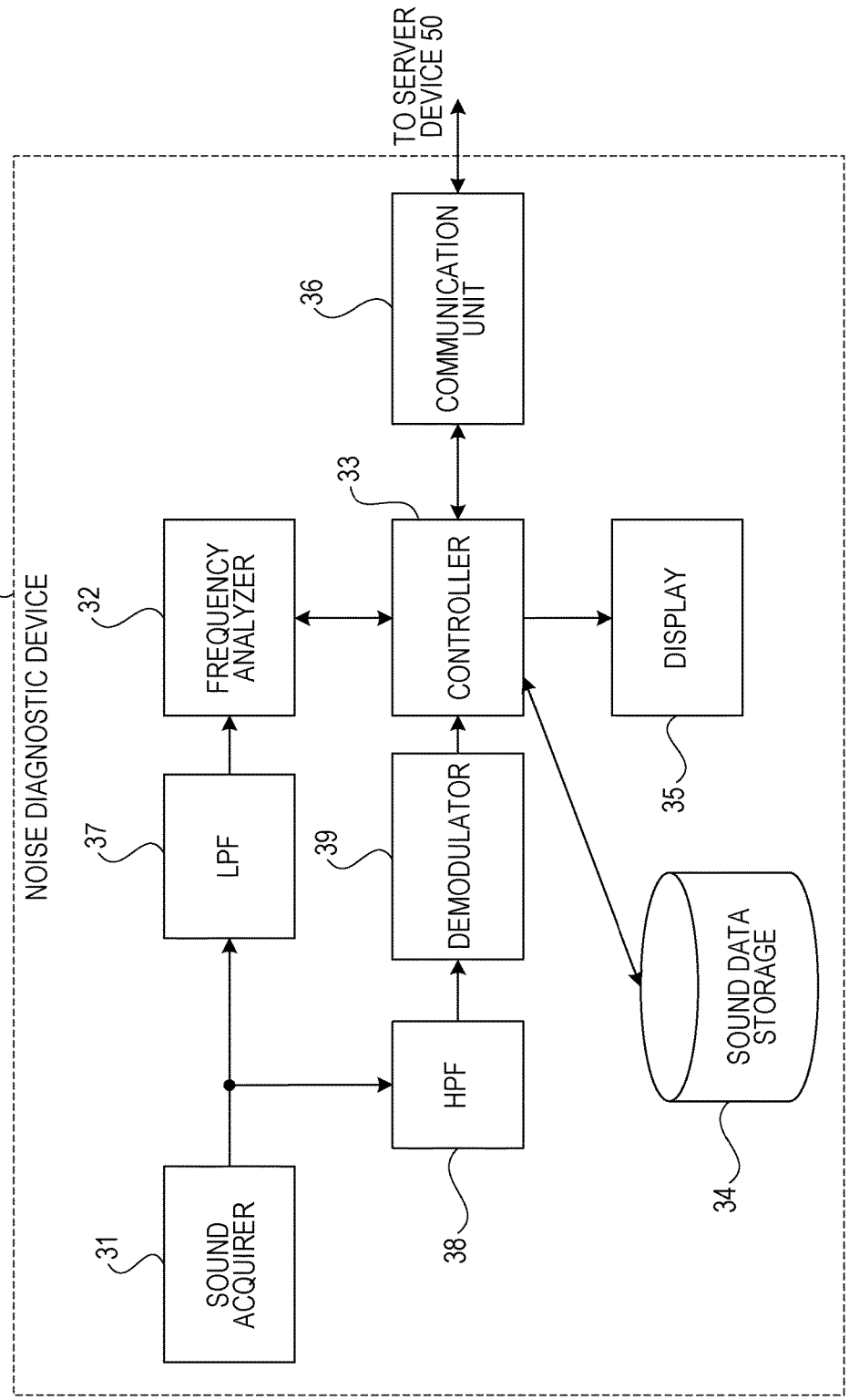
FIG. 3 is a block diagram illustrating a functional configuration of a noise diagnostic device 10 according to an exemplary embodiment of the present invention.

FIG. 3 is a block diagram illustrating a functional configuration of the noise diagnostic device 10 realized as a result of the above control program being executed.

As illustrated in FIG. 3, the noise diagnostic device 10 according to the present exemplary embodiment is equipped with a sound acquirer 31, a frequency analyzer 32, a controller 33, sound data storage 34, a display 35, a communication unit 36, a low-pass filter (LPF) 37, a high-pass filter (HPF) 38, and a demodulator 39.

The display 35 presents a display of various data on the basis of control by the controller 33. The communication unit 36 communicates with an external device, namely the server device 50.

The sound acquirer 31 acquires a sound signal by accepting the input of noise produced in a device to be analyzed, namely the image forming device 20.

Note that although the present exemplary embodiment describes the sound acquirer 31 as acquiring a sound signal by accepting the input of noise produced in the image forming device 20, this sound signal is an example of sound information.

The HPF 38 passes only high-frequency components higher than a preset frequency from the sound signal acquired by the sound acquirer 31. For example, the HPF 38 passes only components equal to or greater than 16 kHz from the sound signal acquired by the sound acquirer 31.

Subsequently, the demodulator 39 demodulates the sound signal with high-frequency components that passed through the HPF 38, and thereby extracts device information related to the device to be analyzed, namely the image forming device 20, that had been modulated onto the sound signal with high-frequency components.

Figure 4:
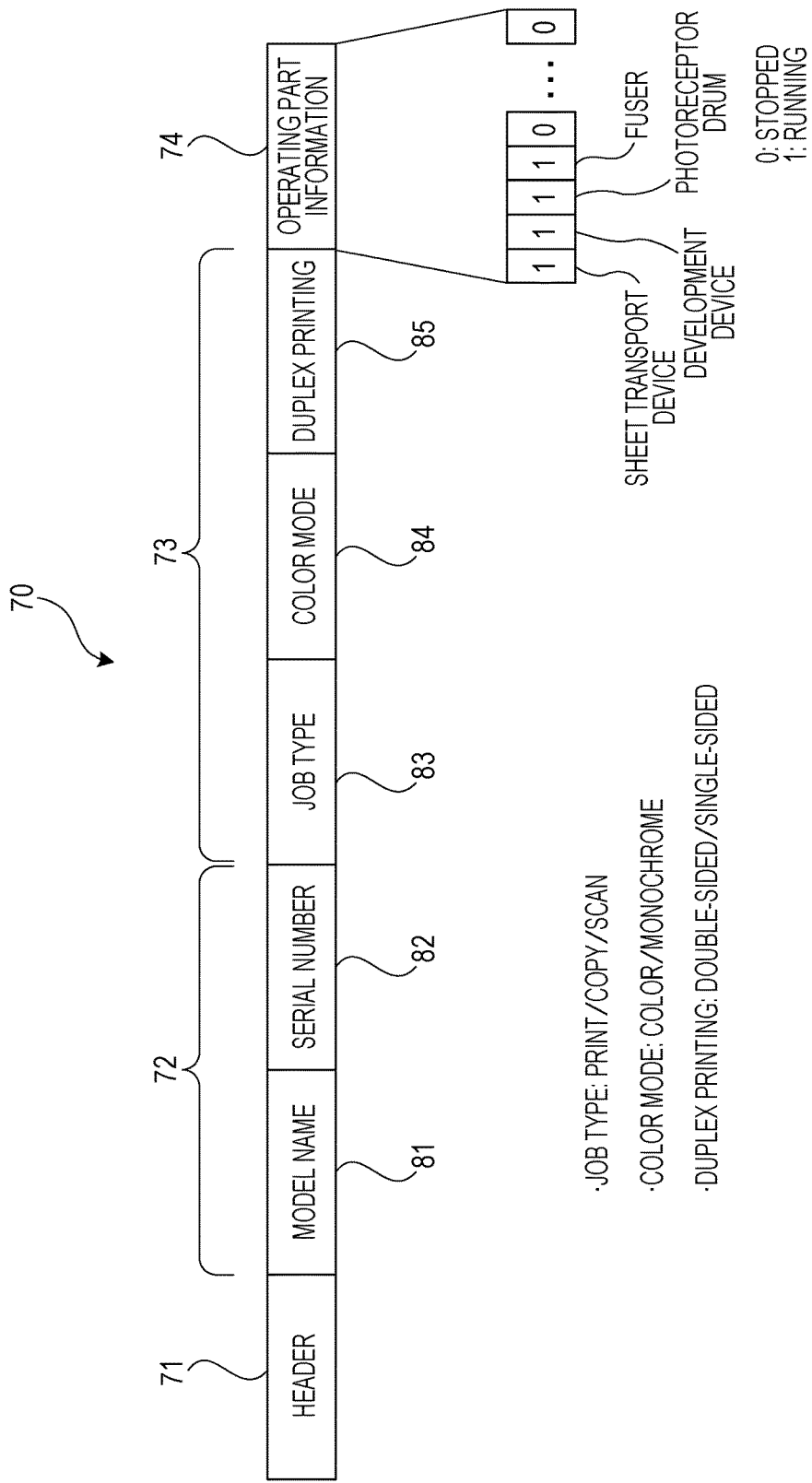
FIG. 4 is a diagram illustrating an example of a data format of device information extracted by a demodulator 39.

FIG. 4 illustrates an example of a data format of device information extracted by the demodulator 39.

The device information 70 illustrated in FIG. 4 is made up of a header 71, model information 72, operating status information 73, and operating part information 74. The model information 72 is made up of a model name 81 and a serial number (manufacturing number) 82 of the image forming device 20 that transmitted the device information 70.

In addition, the operating status information 73 is information related to the operating status of the image forming device 20, and is made up of a job type 83, a color mode 84, and information related to duplex printing 85.

Herein, the information of the job type 83 is information indicating whether the type of job (operating command) being executed by the image forming device 20 is a print job, a copy job, or a scan job. In addition, the information of the color mode 84 is information indicating whether the images being processed are color images or monochrome images. Furthermore, the information related to duplex printing 85 is information indicating double-sided printing or single-sided printing in the case of outputting images to paper sheets.

Furthermore, the operating part information 74 is information indicating which of the multiple parts constituting the device to be analyzed, namely the image forming device 20, are currently running. Specifically, the bits of the operating part information 74 correspond to parts constituting the device, such as a sheet transport device, a development device, a photoreceptor drum, and a fuser, respectively. A bit value of "1" indicates that the corresponding part is running, whereas a bit value of "0" indicates that the corresponding part is stopped.

In addition, the LPF 37 passes only low-frequency components lower than a preset frequency from the sound signal acquired by the sound acquirer 31. For example, the LPF 37 passes only components less than or equal to 16 kHz from the sound signal acquired by the sound acquirer 31.

The frequency analyzer 32 performs time-frequency analysis (time-dependent frequency analysis) on the sound signal obtained after the removal of the high-frequency components of the sound signal by the LPF 37, and generates frequency spectrum waveform data (first analysis result) expressing the change over time in the signal intensity distribution at each frequency of the acquired noise signal. Note that the frequency spectrum waveform data is an analysis result obtained by performing frequency analysis.

Specifically, the frequency analyzer 32 generates frequency spectrum waveform data by applying the short-time Fourier transform (STFT) to the sound signal passed by the LPF 37. The STFT will be described later.

The controller 33 stores the frequency spectrum waveform data obtained by the frequency analyzer 32 together with the sound data in the sound data storage 34. Subsequently, the controller 33 displays the frequency spectrum waveform data obtained by the STFT result on the display 35 that acts as a touch panel.

After that, if the user performs a touch operation on the frequency spectrum waveform data displayed on the display 35, such as an operation of using a finger to trace a region estimated to be noise signal components, the controller 33 receives a specification of a region including noise signal components in the displayed frequency spectrum waveform data, on the basis of the user's touch operation.

Subsequently, the controller 33 instructs the frequency analyzer 32 to execute a fast Fourier transform that performs frequency analysis in the time axis direction (1D-FFT) on the frequency components in the region specified as the region including noise signal components from the frequency spectrum waveform data obtained by the frequency analyzer 32. Consequently, the frequency analyzer 32 performs the fast Fourier transform in the time axis direction on the frequency components included in the designated region.

Subsequently, the controller 33 extracts information about the period and the frequency of noise from the analysis result of the fast Fourier transform by the frequency analyzer 32.

Note that the signal components of ordinary operating sounds are also included in a region of low frequency less than or equal to a preset frequency, even when noise is not produced. For this reason, the controller 33 may also be configured to not accept a specification in the region less than or equal to the preset frequency, even when such a region is specified as the region including noise signal components.

In addition, the controller 33 transmits acquired information about the period and the frequency of the noise, together with model information such as the model name and the serial number of the image forming device 20 and operating status information indicating the operating status of the image forming device 20 extracted by the demodulator 39, to the server device 50 via the communication unit 36.

Note that the device information that the controller 33 transmits to the server device 50 may be configured to include at least one of information about the model name of the device, information about the serial number, and operating state information. In addition, the operating state information may be configured to include not only any of information indicating color printing or monochrome printing, information indicating double-sided printing or single-sided printing, and information indicating whether the type of print job is a scan, print, or copy as discussed earlier, but also information such as the type of paper used and the process speed (image forming speed).

In this way, the controller 33 transmits information obtained from the frequency spectrum waveform data obtained by the frequency analyzer 32 to the server device 50 via the communication unit 36.

In the server device 50, spectrum waveform data obtained by performing frequency analysis on sound signals of noise produced in the past by devices similar to the image forming device 20 is stored together with the original sound data and information such as the operating status of the device, cause of noise, and treatment for the noise when that sound data was acquired.

Subsequently, from the information about the period and the frequency of the noise transmitted from the noise diagnostic device 10, the server device 50 searches for frequency spectrum waveform data (second analysis result) corresponding to the frequency spectrum waveform data obtained as a result of frequency analysis by the frequency analyzer 32, and transmits found frequency spectrum waveform data, together with information such as sound data stored as noise sample waveform data, to the noise diagnostic device 10.

As a result, the controller 33 receives, from the server device 50 via the communication unit 36, frequency spectrum waveform data corresponding to the frequency spectrum waveform data obtained as a result of the frequency analysis by the frequency analyzer 32.

The controller 33 controls the display 35 to display the frequency spectrum waveform data obtained by performing frequency analysis on the sound signal acquired by the sound acquirer 31, in parallel with the spectrum waveform received from the server device 50.

Note that if there are multiple sets of frequency spectrum waveform data transmitted from the server device 50, the controller 33 gives priority to the one among the multiple sets of frequency spectrum waveform data having the highest similarity to the frequency spectrum waveform data obtained by frequency analysis by the frequency analyzer 32 for display on the display 35.

Next, a functional configuration of the server device 50 in a noise diagnostic system according to the present exemplary embodiment will be described with reference to the block diagram in FIG. 5.

Figure 5:
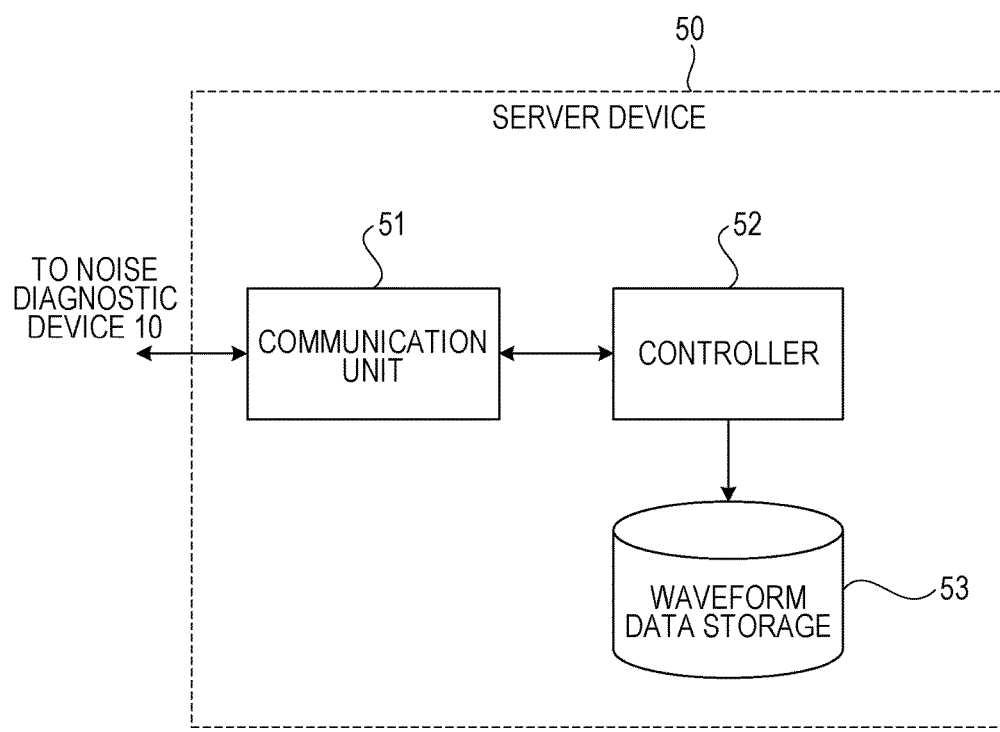
FIG. 5 is a block diagram illustrating a functional configuration of a server device 50 according to an exemplary embodiment of the present invention.

As illustrated in FIG. 5, the server device 50 according to the present exemplary embodiment is equipped with a communication unit 51, a controller 52, and waveform data storage 53.

The waveform data storage 53 stores multiple sets of frequency spectrum waveform data obtained by performing frequency analysis on sound signals of noise produced in the past by devices similar to the device to be analyzed, namely the image forming device 20.

Specifically, as illustrated in FIG. 6, the waveform data storage 53 stores, for each model, information such as frequency spectrum waveform data obtained by performing a time-frequency analysis on the sound data of previously acquired noise, the original sound data, the cause of the noise, and the treatment to address the noise.

Subsequently, in the case of receiving information about the period and the frequency of noise from the noise diagnostic device 10, the controller 52 selects waveform data similar to frequency spectrum waveform data based on the noise acquired in the noise diagnostic device 10 from among the multiple sets of frequency spectrum waveform data stored in the waveform data storage 53, on the basis of the received information about the period and the frequency of the noise, and transmits the selected waveform data to the noise diagnostic device 10 via the communication unit 51.

Figure 7:
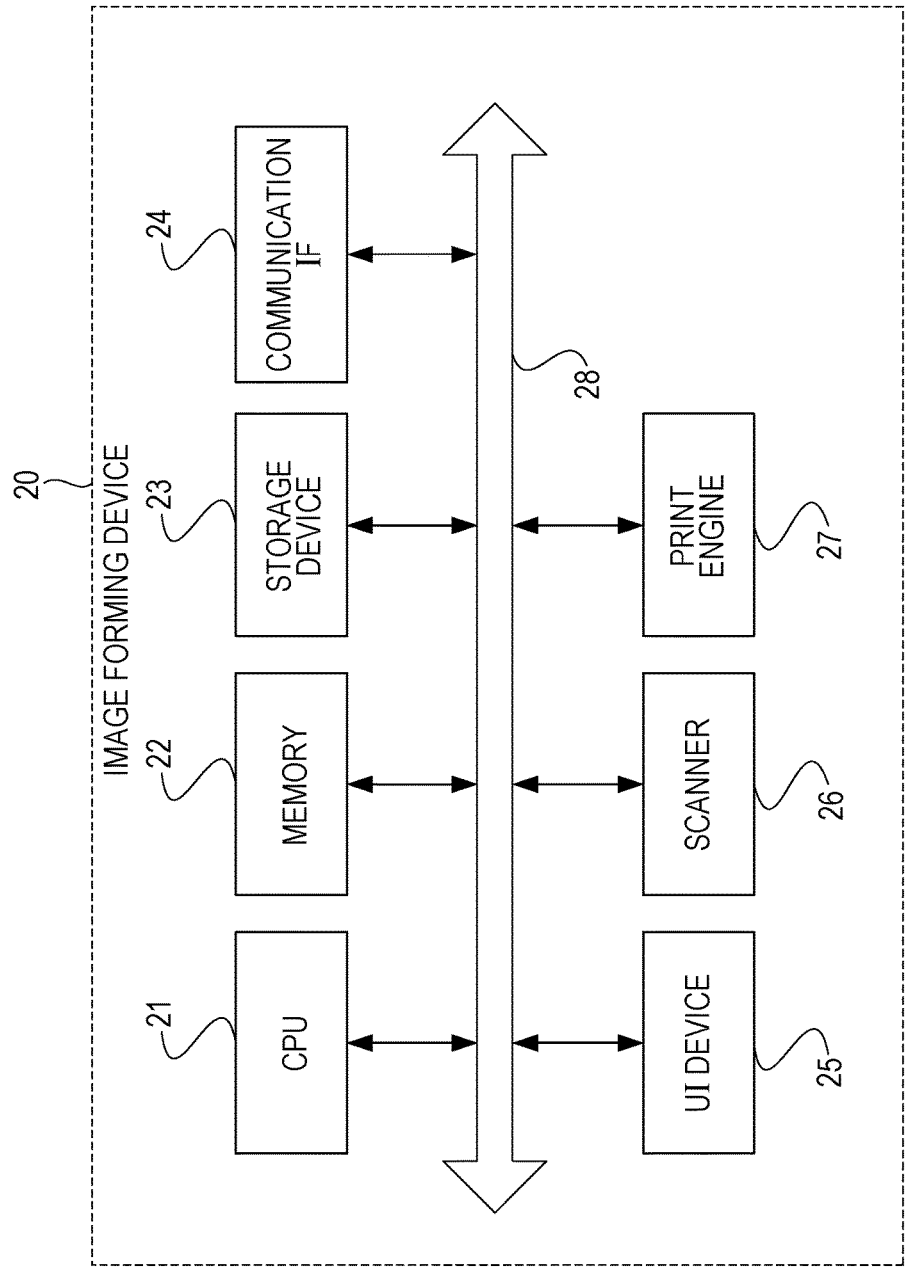
FIG. 7 is a diagram illustrating a hardware configuration of an image forming device 20 according to an exemplary embodiment of the present invention.

Next, FIG. 7 illustrates a hardware configuration of the image forming device 20 according to the present exemplary embodiment.

As illustrated in FIG. 7, the image forming device 20 includes a CPU 21, memory 22, a storage device 23 such as a hard disk drive (HDD), a communication interface (IF) 24 that transmits and receives data to and from external devices and the like over a network, a user interface (UI) device 25 including a touch panel or a liquid crystal display and a keyboard, a scanner 26, and a print engine 27. These structural elements are connected to each other by a control bus 28.

The print engine 27 prints images onto a print medium such as printer paper by going through a series of steps such as charging, exposure, development, transfer, and fusing.

The CPU 21 controls the operation of the image forming device 20 by executing designated processes on the basis of a control program stored in the memory 22 or the storage device 23. Note that although the present exemplary embodiment describes the CPU 21 reading out and executing a control program stored in the memory 22 or the storage device 23, such a program may also be stored on a storage medium such as CD-ROM and provided to the CPU 21.

Figure 8:
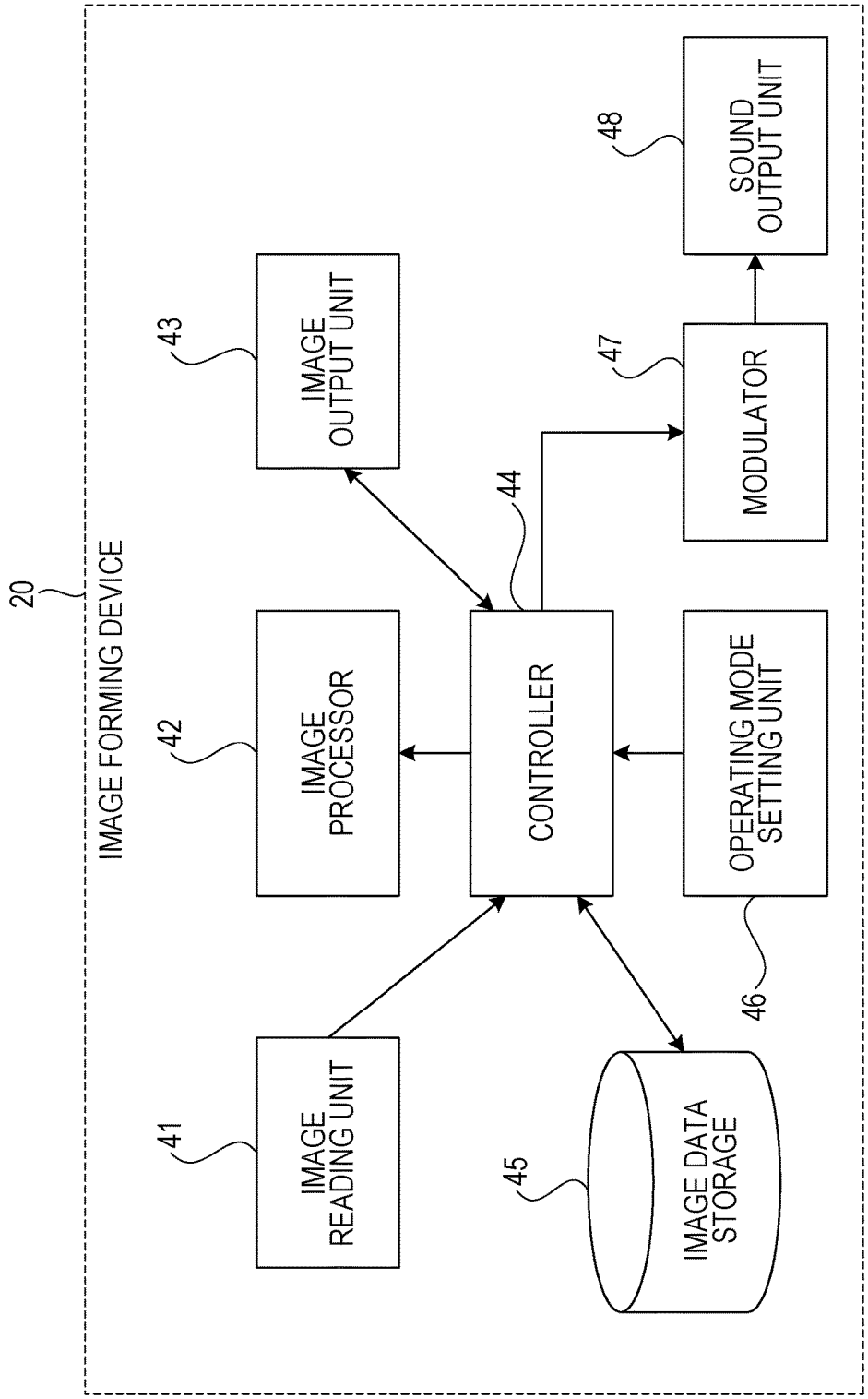
FIG. 8 is a block diagram illustrating a functional configuration of an image forming device 20 according to an exemplary embodiment of the present invention.

FIG. 8 is a block diagram illustrating a functional configuration of the image forming device 20 realized as a result of the above control program being executed.

As illustrated in FIG. 8, the image forming device 20 according to the present exemplary embodiment is equipped with an image reading unit 41, an image processor 42, an image output unit 43, a controller 44, image data storage 45, an operating mode setting unit 46, a modulator 47, and a sound output unit 48.

The image reading unit 41 scans an original image and acquires image data. The image processor 42, on the basis of instructions from the controller 44, executes image processing such as the conversion of image data in the RGB color space to image data in the CMYK color space.

The image output unit 43, on the basis of instructions by the controller 44, executes a process of printing a designated image onto a print medium such as printer paper. The image data storage 45 receives print instructions and stores information such as partially processed image data.

The controller 44 receives various types of execution instructions, such as print, copy, and scan instructions, and controls components such as the image reading unit 41, the image processor 42, and the image output unit 43 to perform control based on the received instructions.

The operating mode setting unit 46 sets the operating mode of the image forming device 20 on the basis of a user operation. At this point, if the user gives an instruction to set the operating status of the image forming device 20 to a noise analysis mode, the operating mode setting unit 46 sets the operating status of the device itself to an operating mode (operating status) for analyzing the cause of noise being produced.

Figure 9:
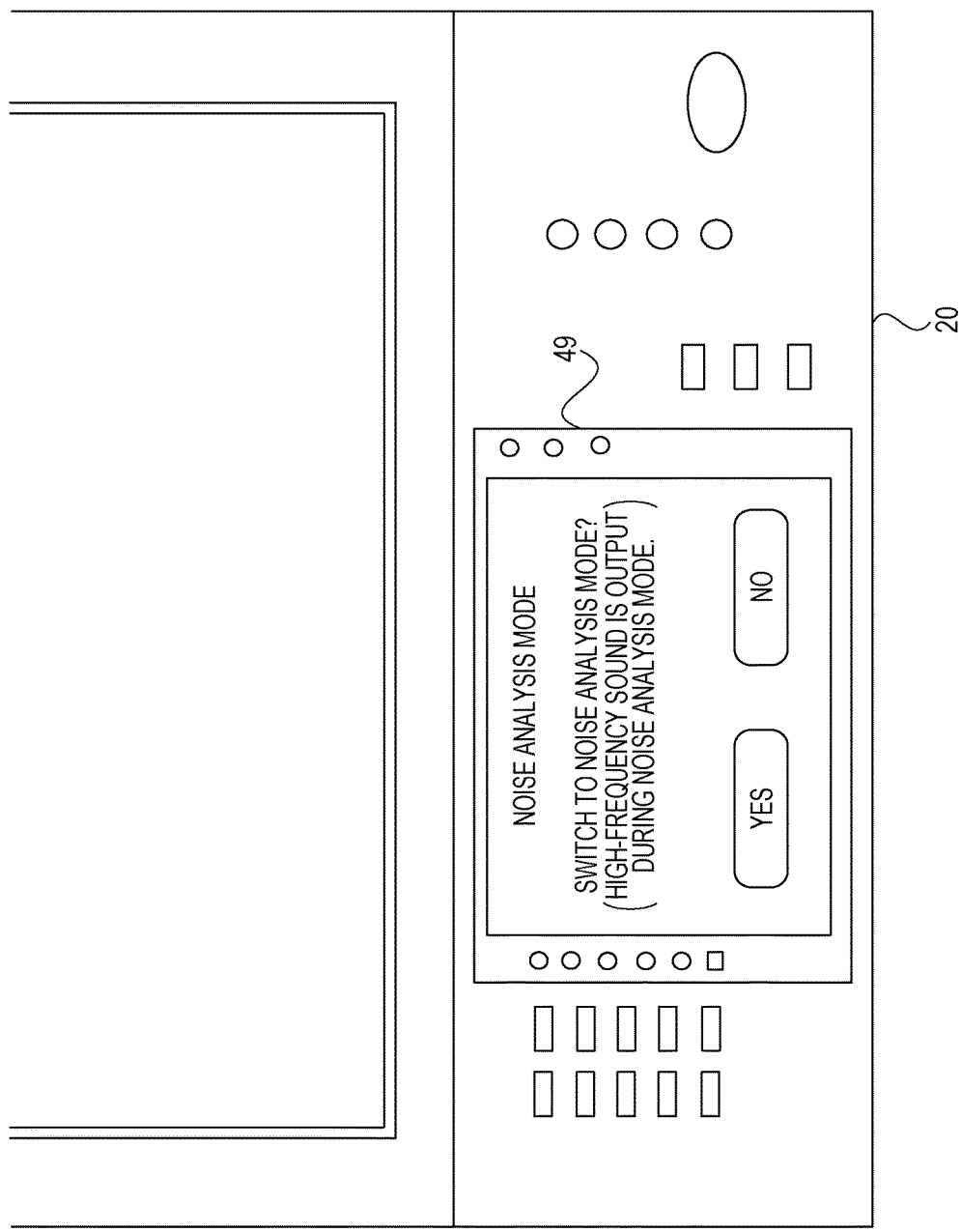
FIG. 9 is a diagram illustrating an example display screen when an operating mode setting unit 46 sets the operating mode to a noise analysis mode for analyzing the cause of noise.

For example, as illustrated in FIG. 9, if the user operates an operating panel 49 of the image forming device 20 and gives an instruction to switch to the noise analysis mode, the operating mode setting unit 46 sets the operating mode with respect to the controller 44 to the noise analysis mode for analyzing the cause of noise being produced.

Subsequently, if the operating mode is set to the noise analysis mode by the operating mode setting unit 46, the controller 44 instructs the modulator 47 to modulate device information made up of information such as model information, such as the model name and the serial number of the device itself, operating status information, and operating part information as described earlier, onto a sound signal for output.

The modulator 47, when given instructions like the above by the controller 44, executes a process such as phase-modulating an inaudible high-frequency signal that is difficult for human hearing to discern, such as a 19 kHz sound signal, for example, according to the device information related to the device itself. In other words, the device information is modulated onto the 19 kHz high-frequency signal by phase modulation.

Herein, the present exemplary embodiment describes a case in which the modulator 47 uses quadrature phase-shift keying (QPSK), which is one phase modulation scheme, to modulate a 19 kHz sound signal by device information.

Figure 10:
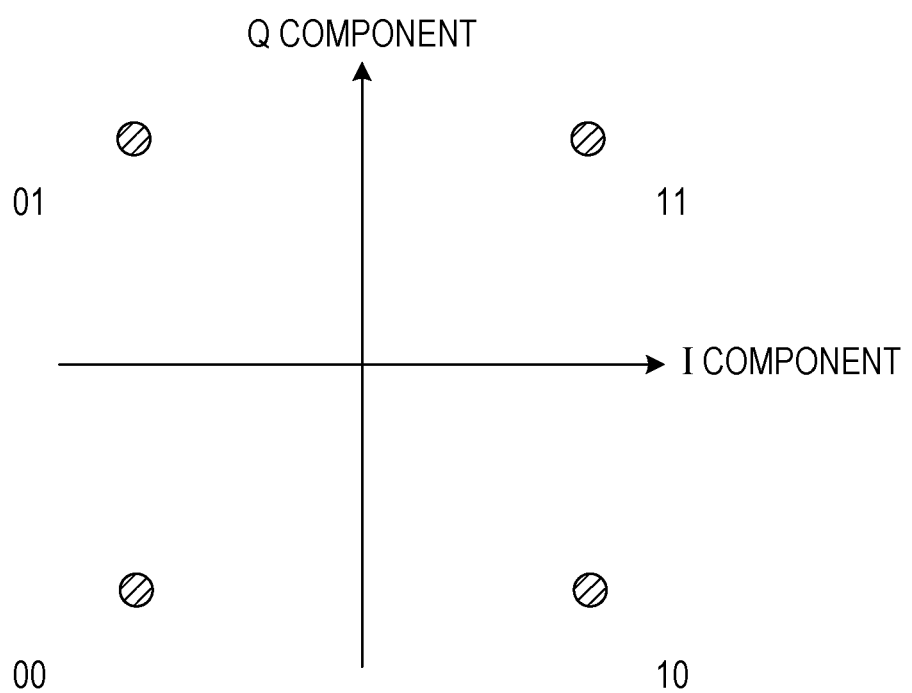
FIG. 10 is a diagram illustrating a constellation diagram for QPSK.

As illustrated in FIG. 10, QPSK is a modulation scheme in which two bits of information such as "11", "10", "00", and "01", are made to correspond respectively with the phases of 45°, 135°, 225°, and 315° with respect to a reference phase. FIG. 10 is a diagram illustrating a constellation diagram for QPSK.

Note that since QPSK is a typical modulation scheme, a detailed description is omitted herein. However, the present invention is not limited to using QPSK as the modulation scheme, and may be applied similarly even in cases of modulating device information onto inaudible sound by using some other modulation scheme, such as another phase modulation scheme such as binary PSK, an amplitude modulation scheme, or a frequency modulation scheme.

Subsequently, the sound output unit 48 outputs the inaudible sound signal modulated with device information by the modulator 47 outside the device via a speaker or the like. In other words, when the operating status of the device itself is set by the operating mode setting unit 46 to an operating mode for analyzing the cause of noise being produced, the sound output unit 48 outputs an inaudible high-frequency signal carrying device information related to the device itself and difficult for human hearing to discern.

Note that since the typical frequency range of human hearing is said to be from approximately 20 Hz to 20 kHz, the frequency range of the inaudible high-frequency signal is preferably higher than this frequency range. However, the human ability to discern sounds degrades as the frequency of the sound signal rises. Also, by causing the image forming device 20 to operate for the purpose of noise analysis, various sounds such as ordinary operating sounds and other low-frequency sounds are also produced. For this reason, even if a high-frequency sound signal modulated with device information is output, the high-frequency sound signal is likely to be indiscernible to nearby people.

For this reason, an inaudible high-frequency signal does not refer to a sound signal outside the range of audible frequencies in the strict sense, such as a supersonic signal, but instead means a sound signal at a high frequency so as to not be heard by nearby people when performing noise analysis. Thus, the present exemplary embodiment describes the case of using a 19 kHz sound signal as an example of the inaudible high-frequency signal.

Figure 11:
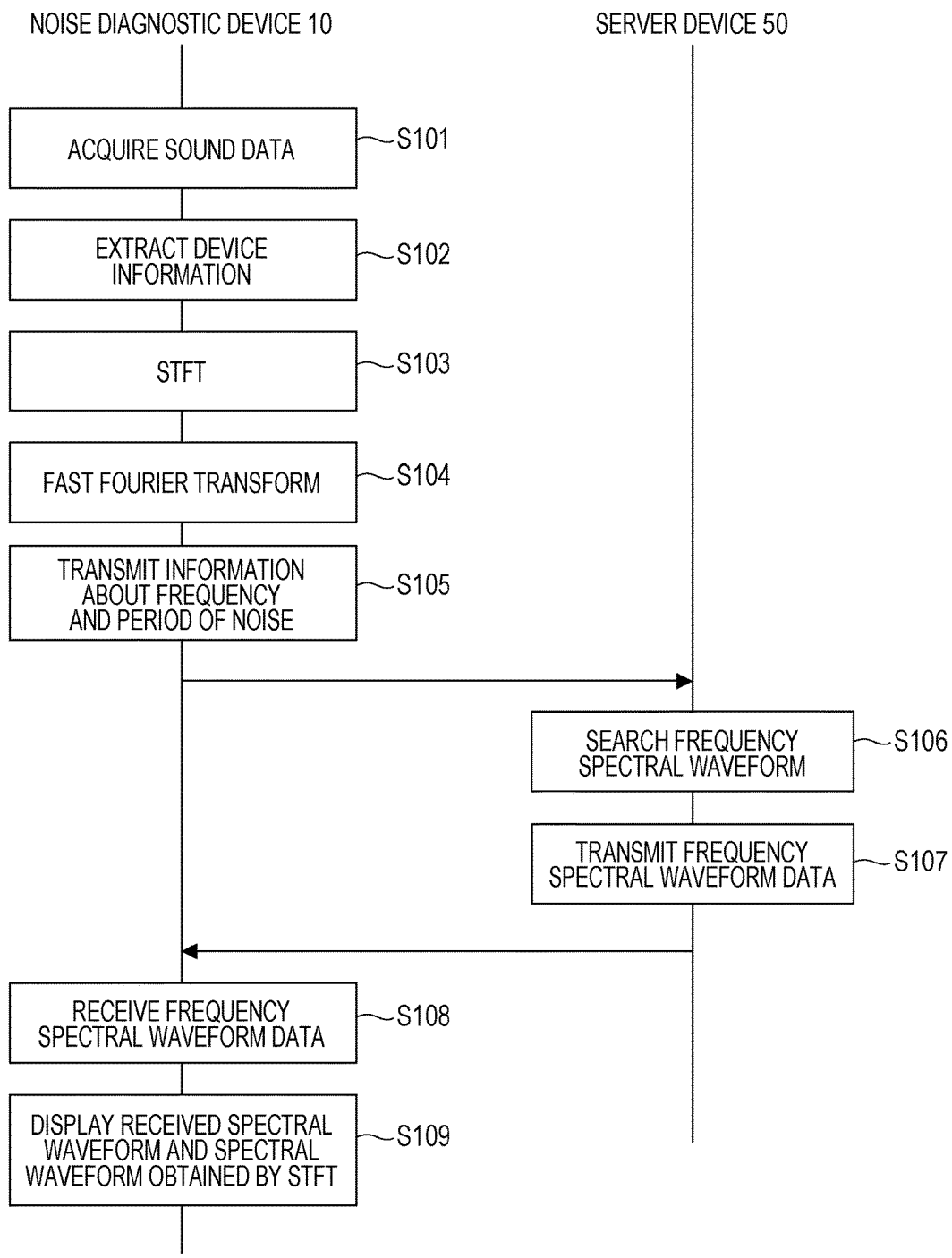
FIG. 11 is a sequence chart for explaining operation of a noise diagnostic system according to an exemplary embodiment of the present invention.

Next, the operation of the noise diagnostic system according to the present exemplary embodiment will be described with reference to the sequence chart in FIG. 11.

Figure 12:
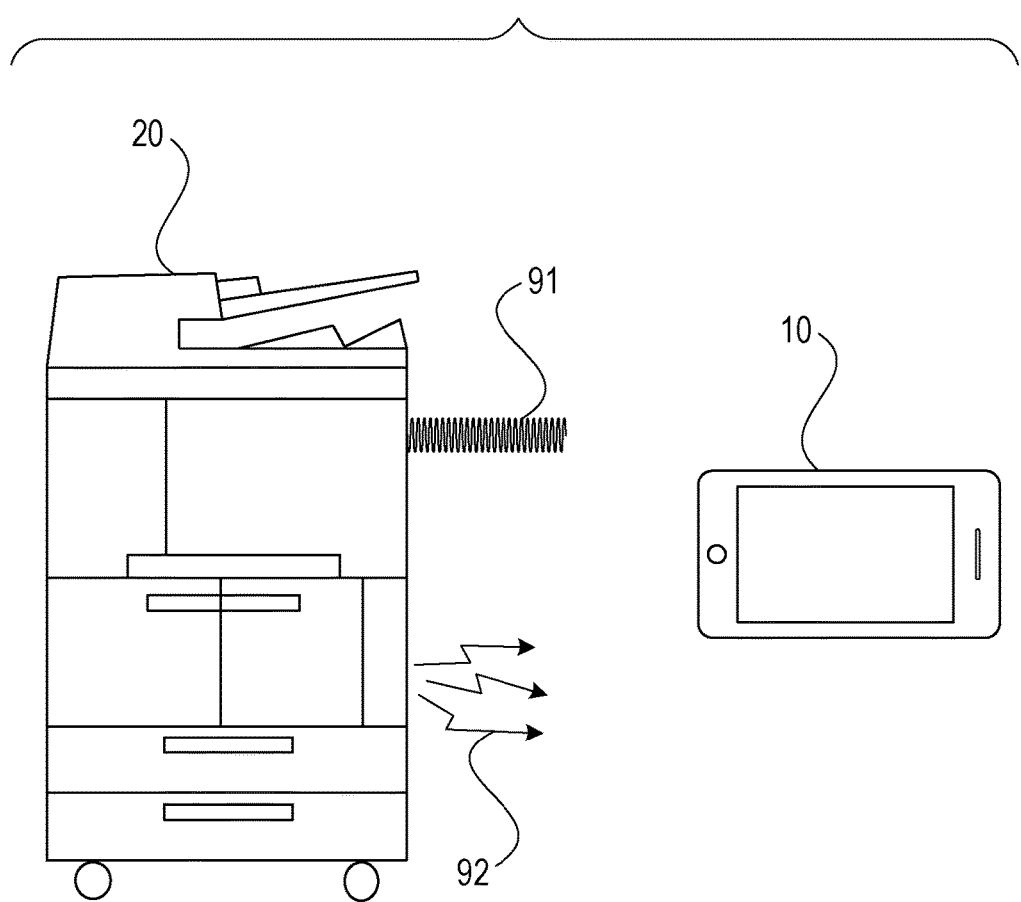
FIG. 12 is a diagram for explaining how an inaudible sound signal modulated with device information, such as information about the model name, is output from the image forming device 20.

In the case of using the noise diagnostic device 10 to perform a noise diagnosis for identifying the cause of noise, the image forming device 20 is set to the noise analysis mode by performing an operation as illustrated in FIG. 9. Subsequently, as illustrated in FIG. 12, an inaudible sound signal modulated with device information, such as information about the model name, is output from the image forming device 20. The image forming device 20 is then made to execute the process that produces the noise while in this state to reproduce noise 92.

Subsequently, in the noise diagnostic device 10, the operating mode is set to a recording mode and the microphone 17 is directed towards the image forming device 20 to record the noise 92 and acquire sound data (step S101). At this point, an inaudible sound signal 91 modulated with device information is also recorded by the noise diagnostic device 10 at the same time.

Subsequently, in the noise diagnostic device 10, the high-frequency components of the acquired sound signal are retrieved and demodulated to thereby extract device information such as the model name which was modulated onto the recorded inaudible sound signal 91 (step S102).

In addition, in the noise diagnostic device 10, the frequency analyzer 32 applies the STFT to the acquired sound data to thereby generate a frequency spectrum waveform expressing the change over time in the signal intensity distribution at each frequency (step S103).

Figure 13:
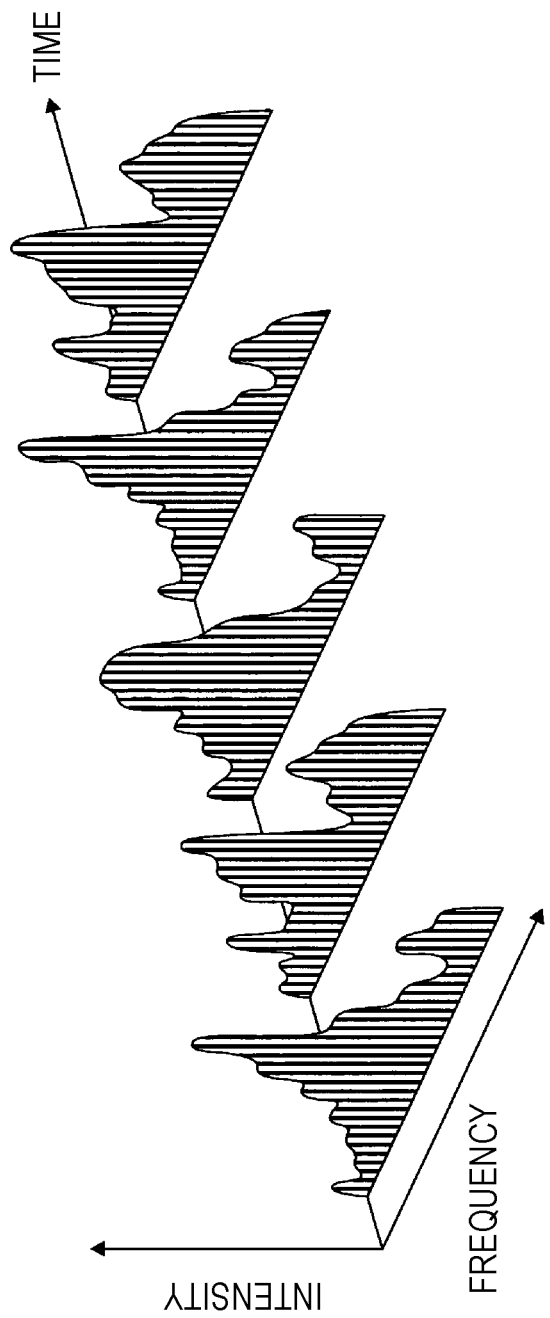
FIG. 13 is a diagram for explaining the concept of the STFT.

As illustrated in FIG. 13, the STFT performs a Fourier transform over short time intervals to compute the signal intensity for each frequency component according to the change over time. Additionally, FIG. 14 illustrates an example waveform in the case of presenting the analysis result obtained by the STFT as a single image of the frequency spectrum waveform.

Figure 14:
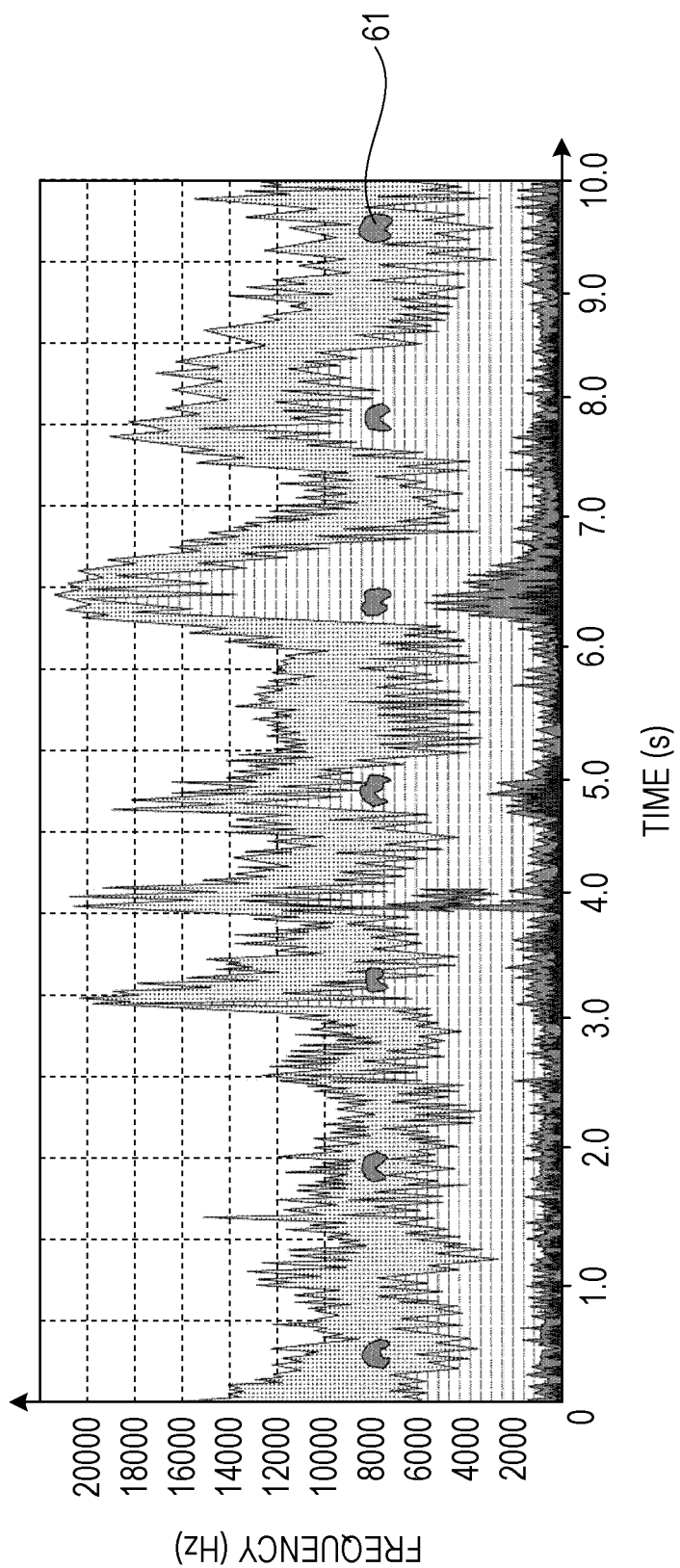
FIG. 14 is a diagram illustrating an example image of a frequency spectrum waveform based on an analysis result obtained by the STFT.

In the example frequency spectrum waveform illustrated in FIG. 14, the horizontal axis represents time, the vertical axis represents frequency, and the intensity at each frequency is expressed according to color. Note that in FIG. 14, differences of color are expressed by hatching patterns. Also, although FIG. 14 illustrates an example of a case in which the intensity at each frequency is expressed according to color, the intensity may also be expressed according to tone.

The example frequency spectrum waveform in FIG. 14 demonstrates a display indicating that a noise frequency component 61 is produced periodically at specific frequencies. Note that in the example frequency spectrum waveform illustrated in FIG. 14, the low-frequency components are ordinary operating sounds, and not noise frequency components.

Figure 15:
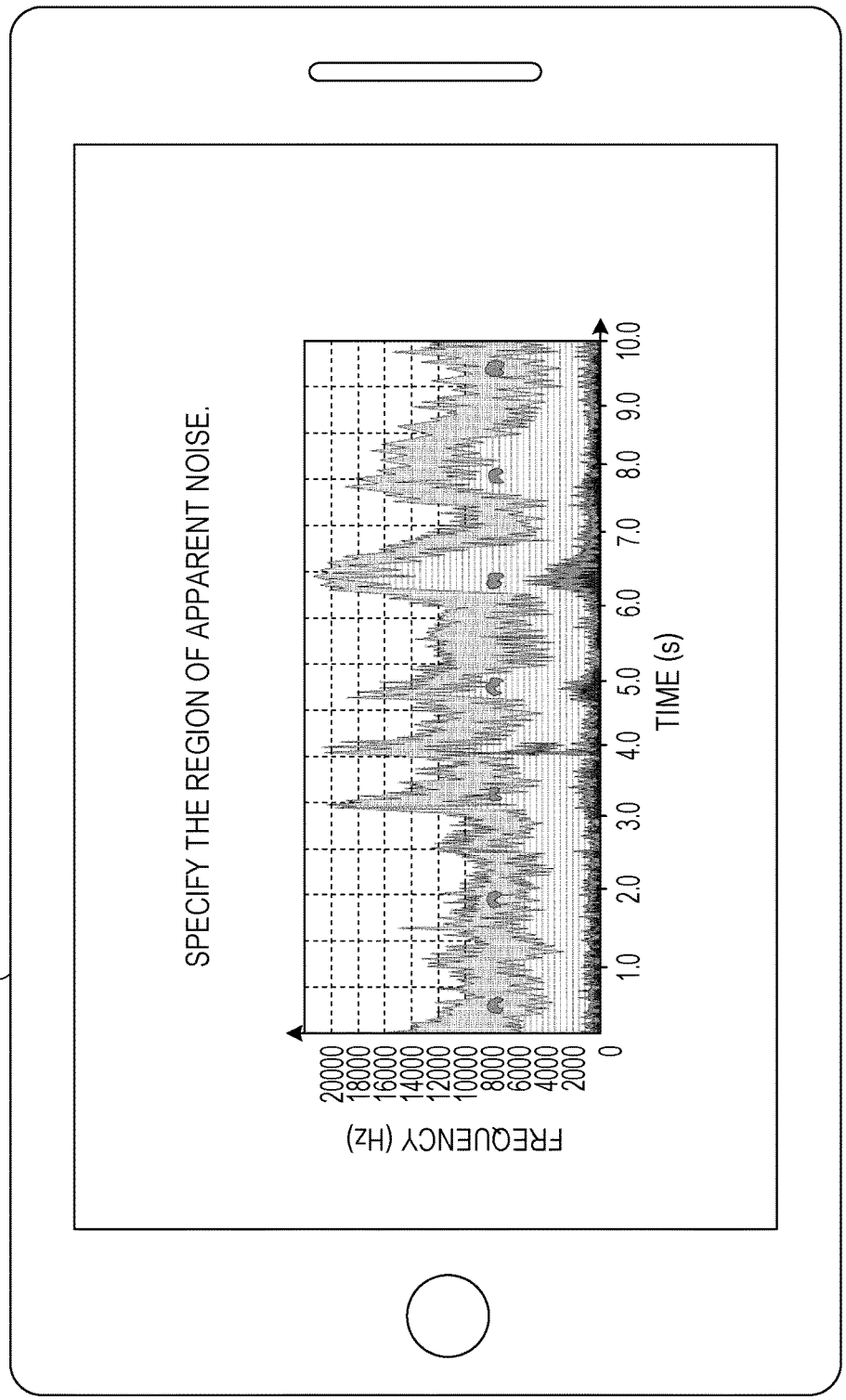
FIG. 15 is a diagram illustrating an example of a case of presenting a display prompting the user to specify a region estimated to be noise when presenting the user with a frequency spectrum waveform.

After a frequency spectrum waveform as illustrated in FIG. 14 is obtained, the controller 33 displays the frequency spectrum waveform on the display 35. Subsequently, as illustrated in FIG. 15, the controller 33 presents a display prompting the user to specify a region estimated to be noise on the displayed frequency spectrum waveform. The example illustrated in FIG. 15 demonstrates that the text "Specify the region of apparent noise." is displayed to prompt the user to specify a region estimated to be noise.

Subsequently, by referring to such a display, the user presented with the frequency spectrum waveform identifies the noise frequency component 61, and selects a region including the noise frequency component 61 by operating the touch panel, for example.

Figure 16:
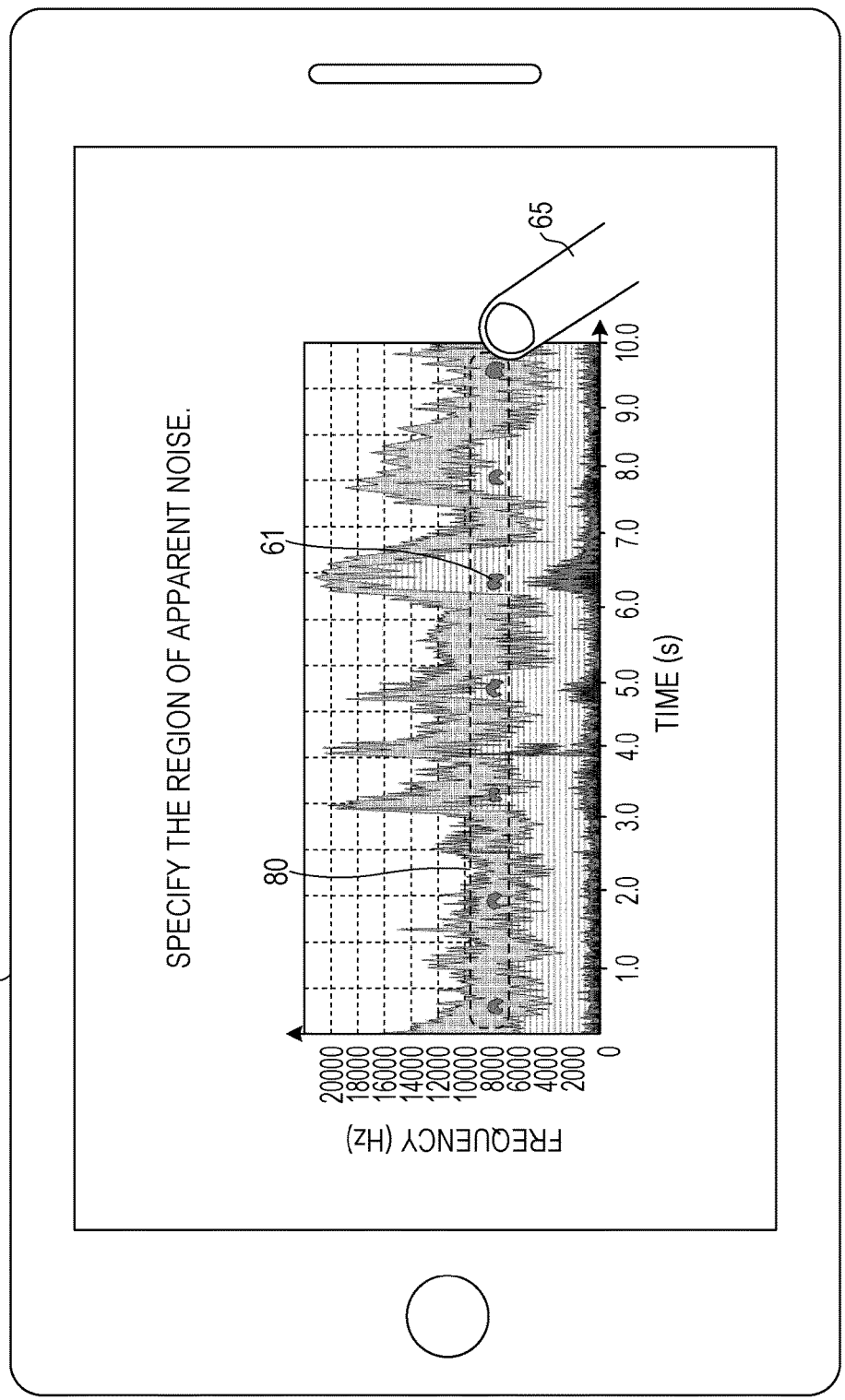
FIG. 16 is a diagram illustrating an example of a selected region 80 selected by the user in the example image of a frequency spectrum waveform in FIG. 15.

FIG. 16 illustrates an example of a selected region 80 selected by the user in this way. The example illustrated in FIG. 16 demonstrates that the user operates the touch panel with his or her finger 65 to thereby specify a rectangular region including multiple noise frequency components 61 as the selected region 80.

Figure 17:
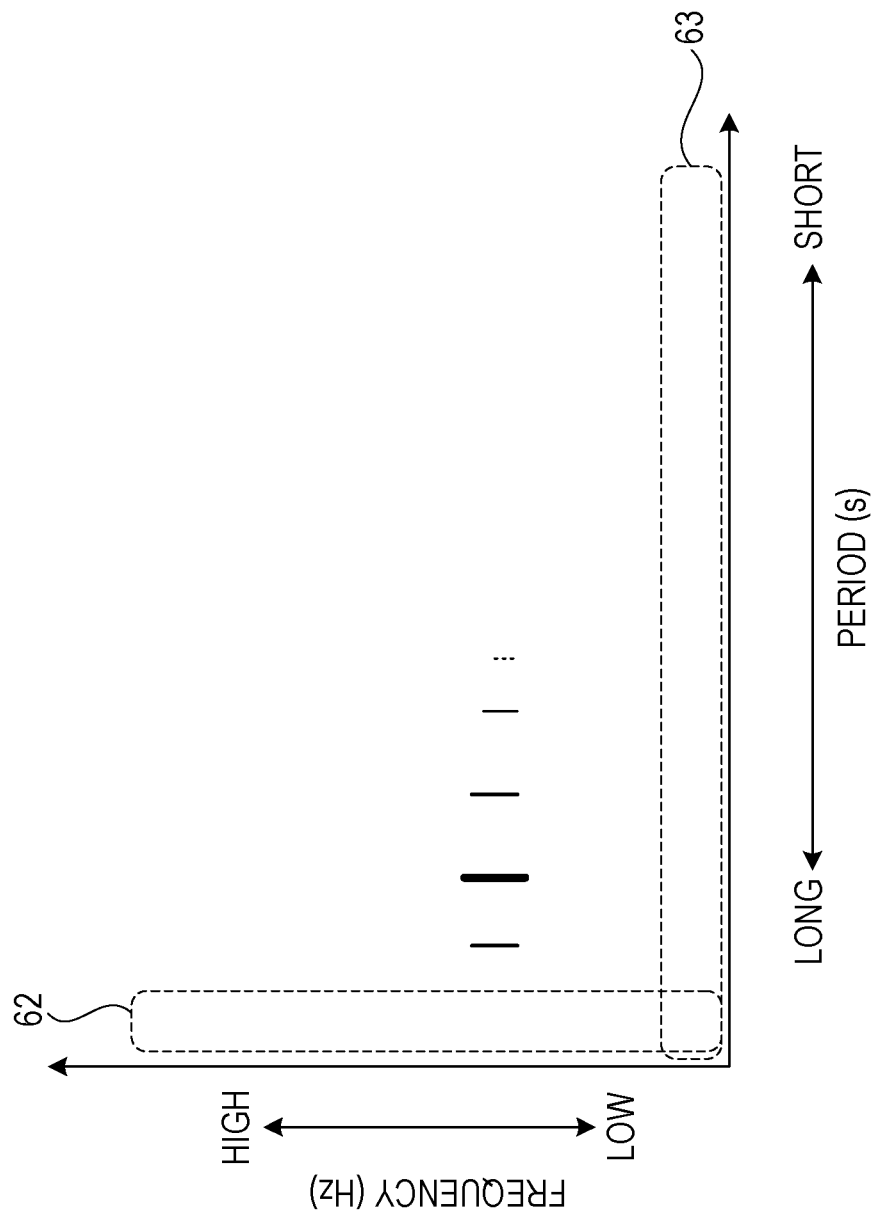
FIG. 17 is a diagram illustrating an example of an analysis result of a fast Fourier transform.

Subsequently, after the selected region 80 is specified in this way, the frequency analyzer 32 executes a fast Fourier transform (1D-FFT) on the frequency components included in the selected region 80 (step S104). FIG. 17 illustrates an example of an analysis result of the fast Fourier transform executed in this way.

Note that in FIG. 17, the period and the frequency of the noise is identified by detecting the period and the frequency of the signal of the frequency components on which the fast Fourier transform was performed. Note that since the noise also includes harmonic components and the like, multiple periods may be detected in some cases, but the period with the strongest signal intensity is detected as the noise period.

Also, since signal components having a long period equal to or greater than a certain period may be considered to be ordinary operating sounds or aperiodic noise, the region of signal components having such a long period is treated as an excluded region 62, and analysis results in the excluded region 62 are ignored.

Furthermore, since signal components of low frequency less than or equal to a certain frequency may be indistinguishable from ordinary operating sounds, the region of signal components having such a low frequency is treated as an excluded region 63, and analysis results in the excluded region 63 are ignored.

In the noise diagnostic device 10, from the analysis result of the fast Fourier transform, information about the frequency and the period of the noise is transmitted together with information about the operating status to the server device 50 (step S105). For example, information indicating a noise frequency of 4 kHz and a noise period of 2.0 s is transmitted to the server device 50.

Subsequently, in the server device 50, the waveform data storage 53 is searched on the basis of the received information, and frequency spectrum waveform data corresponding to the received information is extracted (step S106).

Subsequently, the server device 50 transmits the extracted frequency spectrum waveform data, together with information such as the original sound data, the cause of the noise, and the treatment to address the noise, to the noise diagnostic device 10 (step S107).

After that, the noise diagnostic device 10 receives the frequency spectrum waveform data transmitted from the server device 50 (step S108). Subsequently, the controller 33 of the noise diagnostic device 10 causes the display 35 to display the received frequency spectrum waveform and the frequency spectrum waveform obtained by the STFT (step S109).

Figure 18:
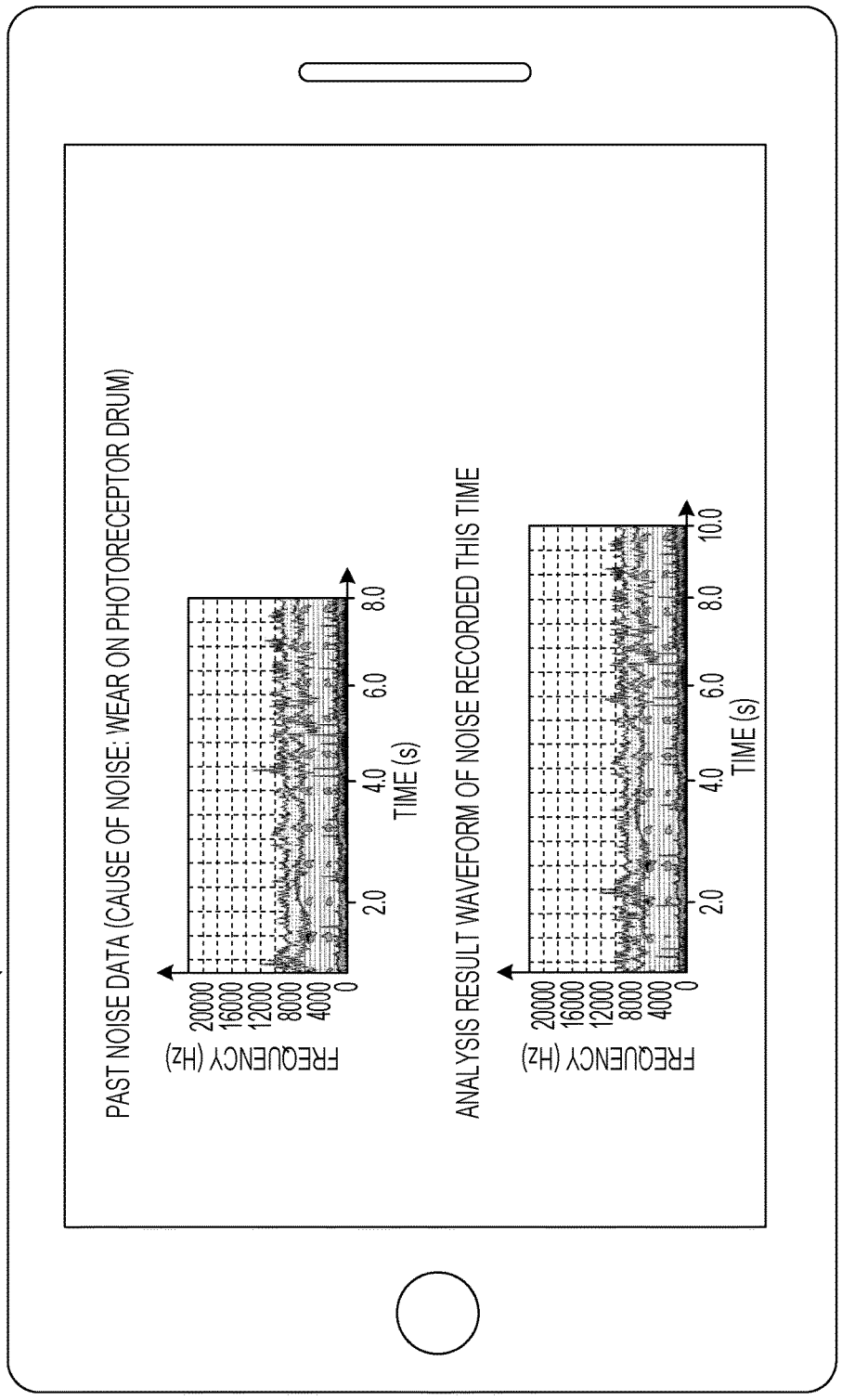
FIG. 18 is a diagram illustrating an example screen of a noise diagnostic device 10 on which two frequency spectrum waveforms are displayed.

FIG. 18 illustrates an example screen on the noise diagnostic device 10 displaying two frequency spectrum waveforms in this way.

The example screen illustrated in FIG. 18 demonstrates that the frequency spectrum waveform obtained by the STFT in the frequency analyzer 32 is displayed as the "Analysis result waveform of noise recorded this time", while the frequency spectrum waveform transmitted from the server device 50 is displayed as "Past noise data" together with the cause of the noise, "wear on photoreceptor drum".

The serviceman attempting to perform a noise diagnosis compares these two frequency spectrum waveforms, and identifies the cause of the noise by determining whether or not the noise components in the waveforms resemble each other.

Figure 19:
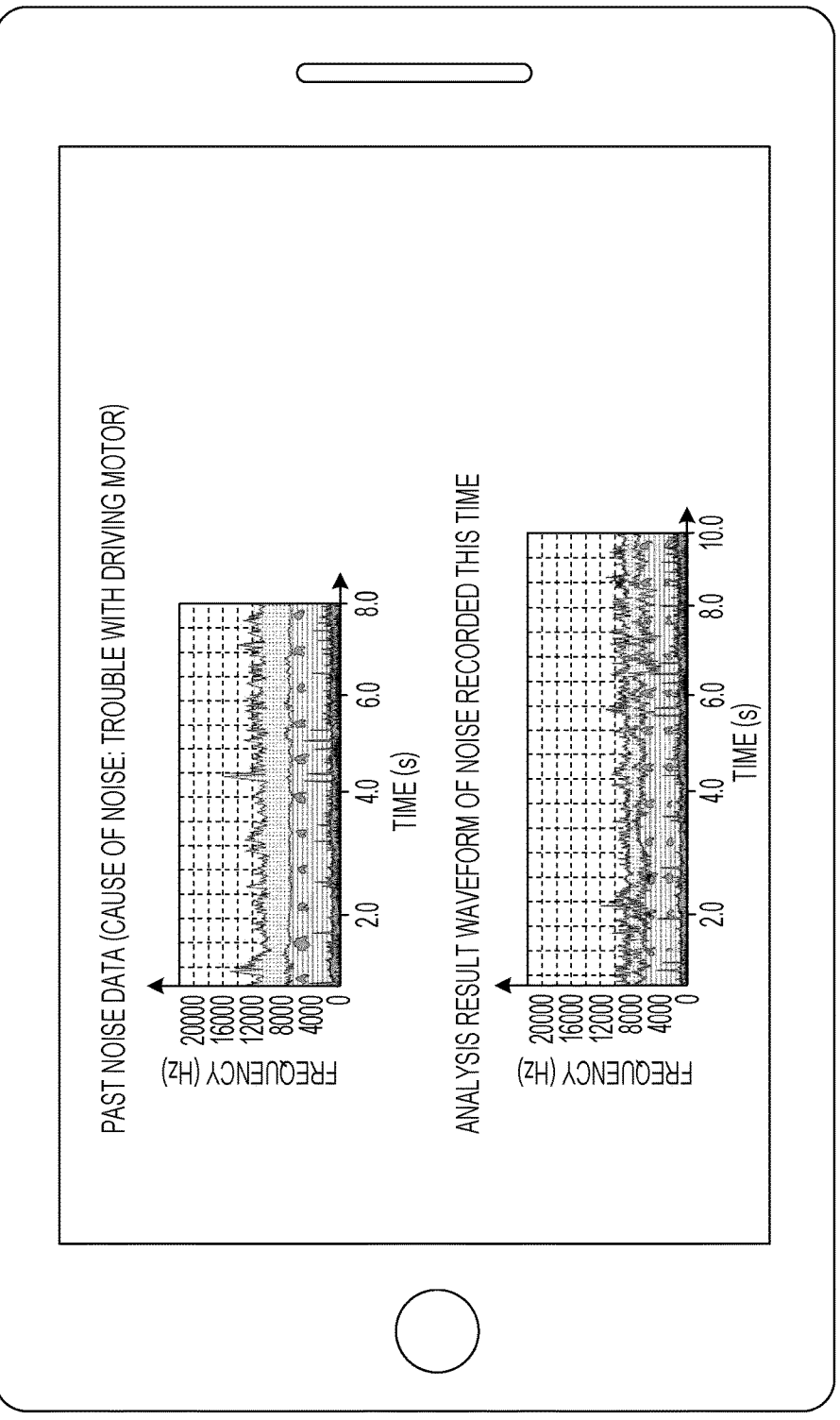
FIG. 19 is a diagram illustrating an example image for a case in which separate frequency spectrum waveforms with a different cause of noise are displayed compared to the example screen illustrated in FIG. 18.

Also, when multiple frequency spectrum waveforms are transmitted from the server device 50, a different frequency spectrum waveform like in FIG. 19 is displayed by performing a touch operation in the horizontal direction on the image of the frequency spectrum waveform being displayed as the "Past noise data", for example.

FIG. 19 illustrates an example image displaying a frequency spectrum waveform of noise for which the cause of the noise is "trouble with driving motor".

When multiple frequency spectrum waveforms are transmitted in this way, the cause of the noise is identified by determining which of the frequency spectrum waveforms resembles the frequency spectrum waveform of the noise recorded this time. Note that when identifying the cause of the noise, the cause of the noise is identified not only by simply comparing features such as the shape of the frequency spectrum waveform or the period and the frequency of the noise components, but also by listening and comparing the noise acquired this time to the noise corresponding to the frequency spectrum waveform transmitted from the server device 50.

Furthermore, as illustrated in FIG. 4, the device information 70 according to the present exemplary embodiment includes operating part information 74 that indicates which of the multiple parts constituting the device to be analyzed are currently running. For this reason, by using the operating part information 74, as illustrated in FIG. 20, the controller 33 may also control the display 35 to display the frequency spectrum waveform obtained by the frequency analyzer 32 together with information indicating the running states of the multiple parts.

Figure 20:
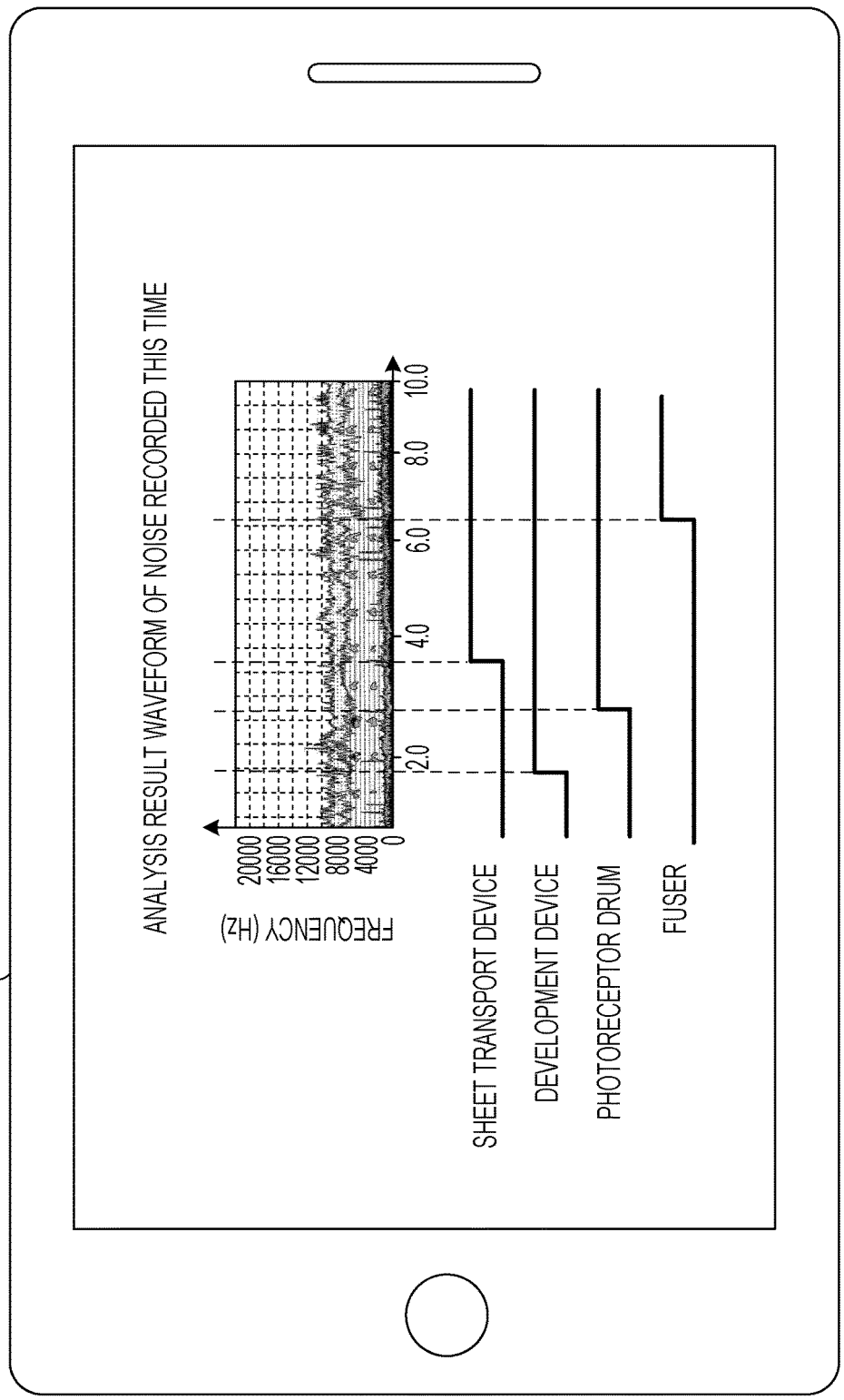
FIG. 20 is a diagram illustrating an example screen in the case of displaying an image of a frequency spectrum waveform together with a timing chart indicating the timings at which each part starts operation.

In the display example illustrated in FIG. 20, the timings at which parts such as the sheet transport device, the development device, the photoreceptor drum, and the fuser start operating are indicated by a timing chart, and by comparing these timings to the image of the frequency spectrum waveform, it is possible to estimate which part has a high likelihood of being the cause of the noise.

Also, packet data of the device information 70 modulated onto the inaudible sound signal 91 and output from the image forming device 20 may be transmitted repeatedly, or be transmitted at specific timings only, such as by transmitting only when the transmitted content changes.

Figure 21:
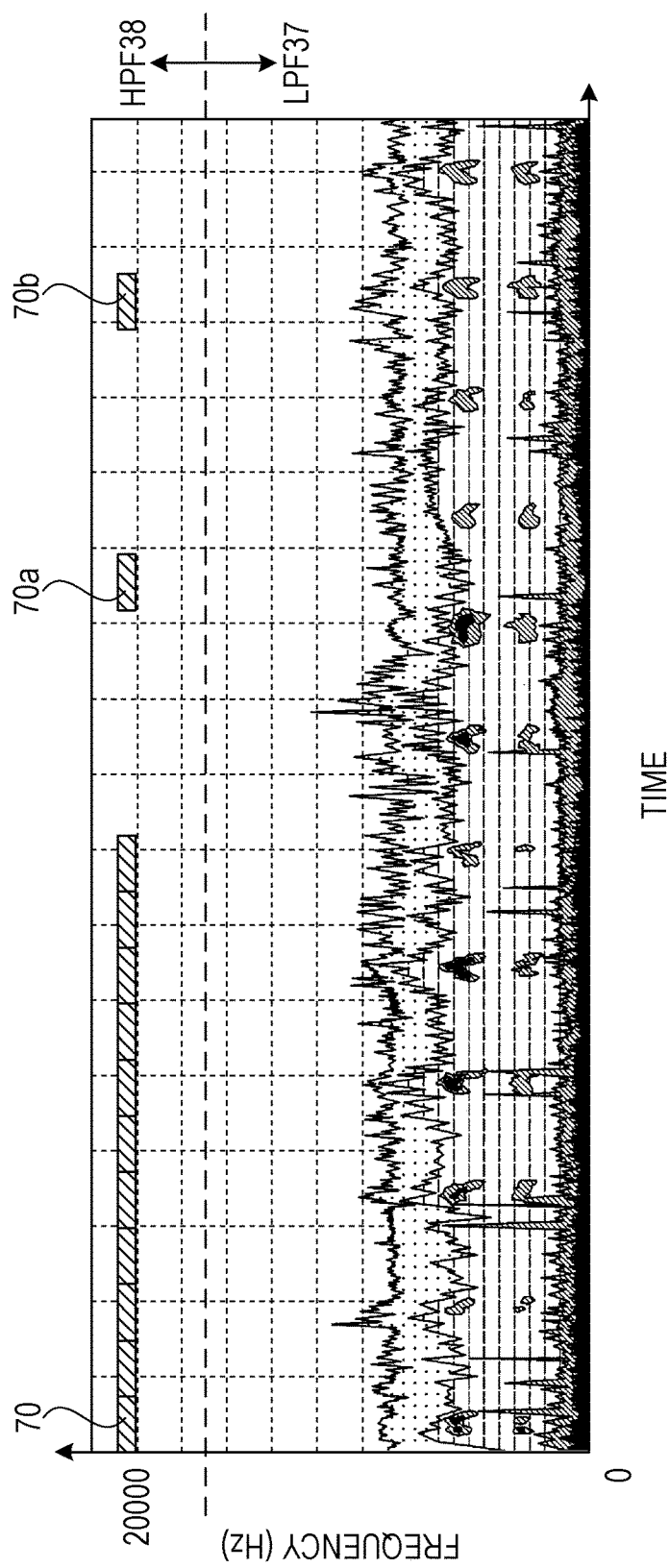
FIG. 21 is a diagram for explaining the timings at which to transmit packet data of device information 70.

For example, in the example transmission illustrated in FIG. 21, the device information 70 is transmitted continuously immediately after recording starts, but after that, device information 70*a* and 70*b* is transmitted individually and only when the transmitted content changes.

In addition, in the case of transmitting only information that does not change partway through, such as the model information 72 and the operating status information 73, it is not necessary to transmit the device information 70 continuously, and it is sufficient to transmit a minimum amount enabling the noise diagnostic device 10 to acquire the device information 70.

Herein, FIG. 21 illustrates the relationship between the frequency spectrum waveform of normal and abnormal sounds acquired from the image forming device 20 and the frequency of the inaudible sound signal 91, and demonstrates that by configuring the respective frequency bands to not overlap, these frequency bands may be separated by the HPF 38 and the LPF 37.

Figure 22:
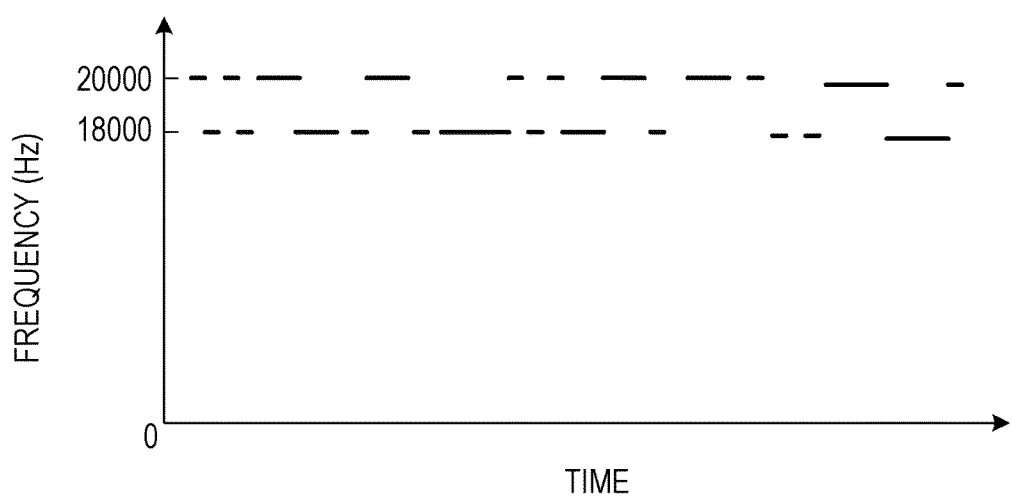
FIG. 22 is a diagram for explaining an example of the case of transmitting device information using two sound signals at 18 kHz and 20 kHz.

In addition, the foregoing describes the case of modulating device information onto a signal by phase modulation of the inaudible sound signal 91 having a single frequency of 19 kHz, but as illustrated in FIG. 22, two sound signals at 18 kHz and 20 kHz may also be used to transmit device information.

In the example illustrated in FIG. 22, the 18 kHz signal is associated with "0" while the 20 kHz signal is associated with "1", and device information is transmitted via sound signal by switching between these two frequencies on the basis of the device information.

In the noise diagnostic device 10 according to the present exemplary embodiment, device information such as the model name is acquired by simply recording a sound signal output from the image forming device 20, without inputting the device information such as the model name by a manual operation, receiving device information from the image forming device 20 via wireless communication such as Wi-Fi, or inputting device information by scanning a one-dimensional code, a two-dimensional code, or the like.

In addition, even if multiple sound signals are recorded, the acquired sound data and the device information such as the model name are reliably associated. Furthermore, whereas device information such as the model name may be input incorrectly with a manual operation by the user, such incorrect input may be avoided.

Exemplary Modifications

The foregoing exemplary embodiment is described using a case in which the noise diagnostic device 10 is a tablet, but the present invention is not limited thereto, and the present invention may also be applied when another device is treated as the noise diagnostic device. For example, if the operating panel of the image forming device 20 is configured to be removable from the device body, is able to communicate with the server device 50, and includes a built-in sound signal acquisition function, the operating panel may also be treated as the noise diagnostic device.

In addition, the foregoing exemplary embodiment is described using a case in which the noise diagnostic device 10 includes a built-in microphone 17, but if the noise diagnostic device 10 is equipped with a sound recording function, the acquisition unit of acquiring a sound signal may also be realized by externally connecting a sound pickup device such as a microphone.

In addition, the foregoing exemplary embodiment is described using a case in which the specification of the region estimated to be noise is performed by the user with a touch operation, but the present invention is not limited to such a configuration. The present invention is similarly applicable even when specifying a region estimated to be noise according to another method, such as specifying a region by pen input, directly inputting a frequency estimated to be noise using numbers, or specifying a region with a mouse operation.

Furthermore, the foregoing exemplary embodiment is described using a case in which the device targeted for noise analysis is an image forming device, but the device targeted for noise analysis is not limited to being an image forming device, and the present invention is similarly applicable even in the case of another device, insofar as the device may possibly produce noise of a periodic nature.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A diagnostic device comprising:
   a microphone that acquires sound information;
   a processor programmed to:
      extract, from the acquired sound information, device information related to a device to be analyzed;
      perform time-frequency analysis on the acquired sound information;
      generate a first analysis result expressing change over time in an intensity distribution at each frequency; and a display that displays the first analysis result, the first analysis result including one or more noise frequency components,
wherein the processor is further programmed to:
receive a user-selected region of the first analysis result, the user-selected region including at least one of the noise frequency components of the one or more noise frequency components;
perform frequency analysis on the at least one of the noise frequency components included in the user-selected region; and
obtain a second analysis result based on the frequency analysis performed on the at least one of the noise frequency components and the device information, and
wherein the display displays the second analysis result.

2. A diagnostic device comprising:
a microphone that acquires sound information;
a processor programmed to:
extract, from the acquired sound information, device information related to a device to be analyzed;
perform time-frequency analysis on the acquired sound information; and
generate a first analysis result expressing change over time in an intensity distribution at each frequency;
a display that displays the first analysis result, the first analysis result including one or more noise frequency components,
wherein the processor is further programmed to:
receive a user-selected region of the first analysis result, the user-selected region including at least one of the noise frequency components of the one or more noise frequency components; and
perform frequency analysis on the at least one of the noise frequency components included in the user-selected region; and
a network interface that:
transmits, to an external device, information obtained from the first analysis result, information based on the frequency analysis performed on the at least one of the noise frequency components, and the device information; and
receives, from the external device, a second analysis result based on the user-selected region including the at least one of the noise frequency components,
wherein the display displays the second analysis result.

3. The diagnostic device according to claim 1, wherein the device information includes at least one of information about a model name of the device to be analyzed, information about a serial number of the device to be analyzed, and operating status information related to an operating status of the device to be analyzed.

4. The diagnostic device according to claim 1, wherein the device information includes operating part information indicating which of a plurality of parts constituting the device to be analyzed are currently running, and
the display displays the first analysis result together with information indicating a running status of the plurality of parts.

5. A diagnostic device comprising:
a microphone that acquires sound information;
a processor programmed to:
extract, from the acquired sound information, device information that includes operating part information indicating which of a plurality of parts constituting a device to be analyzed are currently running;
perform time-frequency analysis on the acquired sound information; and
generate a first analysis result expressing change over time in an intensity distribution at each frequency; and
a display that displays the first analysis result, the first analysis result including one or more noise frequency components,
wherein the processor is further programmed to:
receive a user-selected region of the first analysis result, the user-selected region including at least one of the noise frequency components of the one or more noise frequency components;
perform frequency analysis on the at least one of the noise frequency components included in the user-selected region; and
obtain a second analysis result based on the frequency analysis performed on the at least one of the noise frequency components and the device information, and
wherein the display displays the second analysis result.

6. The diagnostic device according to claim 1, wherein a frequency band carrying the device information is in a range of 18-20 kHz.

7. The diagnostic device according to claim 1, wherein the device information is carried by phase modulation of a high-frequency signal having a frequency band in a range of 18-20 kHz.

8. A diagnostic system comprising:
a microphone that acquires sound information;
a memory that stores a plurality of second analysis results obtained by performing frequency analysis on a sound signal of noise;
a processor programmed to:
extract, from the acquired sound information, device information related to a device to be analyzed;
perform time-frequency analysis on the acquired sound information; and
generate a first analysis result expressing change over time in an intensity distribution at each frequency; and
a display that displays the first analysis result, the first analysis result including one or more noise frequency components,
wherein the processor is further programmed to:
receive a user-selected region of the first analysis result, the user-selected region including at least one of the noise frequency components of the one or more noise frequency components;
perform frequency analysis on the at least one of the noise frequency components included in the user-selected region; and
use information obtained from the frequency analysis performed on the at least one of the noise frequency components and the device information to select a second analysis result based on the user-selected region having the noise frequency component from among the plurality of second analysis results stored in the memory; and
wherein the display displays the second analysis result.

9. A device comprising:
a display screen;
a processor programmed to set an operating status of the device itself to an operating status for analyzing a cause of noise being produced; and
a microphone that, in a case of the operating status of the device itself being set to the operating status for analyzing the cause of noise being produced, outputs a high-frequency signal carrying device information related to the device itself, the high-frequency signal being difficult for human hearing to discern, and acquires sound information, wherein the processor is configured to: (i) perform time-frequency analysis on the acquired sound information; (ii) generate a first analysis result expressing change over time in an intensity distribution at each frequency; and (iii) display, on the display screen, the first analysis result, the first analysis result including one or more noise frequency components; (iv) receive a user-selected region of the first analysis result, the user-selected region including at least one of the noise frequency components of the one or more noise frequency components; (v) perform frequency analysis on the at least one of the noise frequency components included in the user-selected region; (vi) obtain a second analysis result based on the frequency analysis performed on the at least one of the noise frequency components and the device information; and (vii) display, on the display screen, the second analysis result.

10. A diagnostic method comprising:

acquiring sound information;

extracting, from the acquired sound information, device information related to a device to be analyzed;

performing time-frequency analysis on the acquired sound information;

generating a first analysis result expressing change over time in an intensity distribution at each frequency;

displaying the first analysis result, the first analysis result including one or more noise frequency components;

receiving a user-selected region of the first analysis result, the user-selected region including at least one of the noise frequency components of the one or more noise frequency components;

performing frequency analysis on the at least one of the noise frequency components included in the user-selected region;

obtaining a second analysis result based on the frequency analysis performed on the at least one of the noise frequency components and the device information; and displaying the second analysis result.

11. A non-transitory computer-readable medium storing a program causing a computer to execute a diagnostic process, the diagnostic process comprising:

acquiring sound information;

extracting, from the acquired sound information, device information related to a device to be analyzed;

performing time-frequency analysis on the acquired sound information;

generating a first analysis result expressing change over time in an intensity distribution at each frequency;

displaying the first analysis result, the first analysis result including one or more noise frequency components;

receiving a user-selected region of the first analysis result, the user-selected region including at least one of the noise frequency components of the one or more noise frequency components;

performing frequency analysis on the at least one of the noise frequency components included in the user-selected region;

obtaining a second analysis result based on the frequency analysis performed on the at least one of the noise frequency components and the device information; and displaying the second analysis result.

12. The diagnostic device according to claim 1, wherein the user-selected region excludes regions having a long period equal to or greater than a certain period or frequency.

13. The diagnostic device according to claim 2, wherein the user-selected region excludes regions having a long period equal to or greater than a certain period or frequency.

14. The diagnostic device according to claim 5, wherein the user-selected region excludes regions having a long period equal to or greater than a certain period or frequency.

15. The diagnostic system according to claim 8, wherein the user-selected region excludes regions having a long period equal to or greater than a certain period or frequency.

16. The device according to claim 9, wherein the user-selected region excludes regions having a long period equal to or greater than a certain period or frequency.

17. The diagnostic method according to claim 10, wherein the user-selected region excludes regions having a long period equal to or greater than a certain period or frequency.

18. The non-transitory computer-readable medium according to claim 11, wherein the user-selected region excludes regions having a long period equal to or greater than a certain period or frequency.

* * * * *